United States Patent
Elrod

(10) Patent No.: US 12,478,702 B2
(45) Date of Patent: Nov. 25, 2025

(54) SCENT CONTROL DEVICE AND METHODS FOR TREATING AN ENVIRONMENT

(71) Applicant: Scott A. Elrod, Lake Jackson, TX (US)

(72) Inventor: Scott A. Elrod, Lake Jackson, TX (US)

( * ) Notice: Subject to any disclaimer, the term of this patent is extended or adjusted under 35 U.S.C. 154(b) by 155 days.

(21) Appl. No.: 18/169,584

(22) Filed: Feb. 15, 2023

(65) Prior Publication Data

US 2023/0190979 A1   Jun. 22, 2023

Related U.S. Application Data

(63) Continuation of application No. 17/526,189, filed on Nov. 15, 2021, which is a continuation-in-part of application No. PCT/US2021/026604, filed on Apr. 9, 2021.

(60) Provisional application No. 63/008,157, filed on Apr. 10, 2020.

(51) Int. Cl.
*A61L 9/015* (2006.01)
*A61L 9/14* (2006.01)

(52) U.S. Cl.
CPC ............... *A61L 9/015* (2013.01); *A61L 9/14* (2013.01); *A61L 2209/111* (2013.01); *A61L 2209/16* (2013.01); *A61L 2209/212* (2013.01)

(58) Field of Classification Search
CPC ...... A61L 9/015; A61L 9/14; A61L 2209/111; A61L 2209/16; A61L 2209/212; A61L 2/202; A61L 9/20; A61L 9/22; A61L 2209/11; A61L 2202/11; A61L 2209/00; A61L 2/10; A61L 2/24; G01N 33/0039
See application file for complete search history.

(56) References Cited

U.S. PATENT DOCUMENTS

| | | | |
|---|---|---|---|
| 6,287,550 B1 * | 9/2001 | Trinh | A61L 9/14 424/45 |
| 2002/0090317 A1 | 7/2002 | Hardy et al. | |
| 2006/0008379 A1 | 1/2006 | Mielnik et al. | |
| 2012/0063949 A1 | 3/2012 | Jennings | |
| 2012/0076702 A1 * | 3/2012 | Dunkley | A61L 2/24 422/186.12 |
| 2012/0315188 A1 | 12/2012 | Shannon et al. | |

(Continued)

FOREIGN PATENT DOCUMENTS

| | | |
|---|---|---|
| JP | H09122218 A | 5/1997 |
| JP | 2000346538 A | 12/2000 |

OTHER PUBLICATIONS

Examination Report for UK Application No. 2213841.6, mailed Jun. 5, 2024 (7 pages).

(Continued)

*Primary Examiner* — Dean Kwak
(74) *Attorney, Agent, or Firm* — DORSEY & WHITNEY LLP

(57) ABSTRACT

Systems and methods to treat an environment. The system includes a plurality of scent control material sources configured to output a scent control material (e.g., an oxidant) into the environment to reduce pathogens, dispose of scent molecules and their sources, and otherwise treat the environment. The system can include a controller communicatively coupled to the plurality of scent control material sources and cause one or more subsets of the plurality of scent control material sources to individually or collectively output scent control material into the environment.

20 Claims, 12 Drawing Sheets

(56) References Cited

U.S. PATENT DOCUMENTS

| | | |
|---|---|---|
| 2014/0366809 A1 | 12/2014 | Huck et al. |
| 2016/0231720 A1 | 8/2016 | Choi et al. |
| 2017/0246334 A1 | 8/2017 | Krishnan et al. |
| 2018/0264157 A1 | 9/2018 | Benedek et al. |
| 2019/0365941 A1* | 12/2019 | Elrod ........................ A61L 9/20 |
| 2019/0369576 A1 | 12/2019 | Elrod |
| 2021/0069369 A1 | 3/2021 | Elrod |

OTHER PUBLICATIONS

Extended European Search Report for EP Application No. 21784426.5, mailed Mar. 11, 2024 (8 pages).
https://sciencing.com/increase-barometric-pressure-home-12108795.html.
https://www.ictinternational.com/casestudies/understanding-oxygen-in-air/.
"HR200", https://www.abcconf.com/Store/pc/viewPrd.asp?idproduct=62734&gad_source=1&gclid=EAIaIQobChMI6Lico9vciAMVHGFHAR11sA0JEAQYAyABEgKHOvD_BwE.

* cited by examiner

SCENT CONTROL DEVICE AND METHODS FOR TREATING AN ENVIRONMENT

CROSS-REFERENCE TO RELATED APPLICATIONS

This application is a continuation of U.S. patent application Ser. No. 17/526,189 filed on 15 Nov. 2021, which is a continuation-in-part of International Patent Application No. PCT/US2021/026604 filed on 9 Apr. 2021, which claims priority to U.S. Provisional Application No. 63/008,157 filed on 10 Apr. 2020, all of which are incorporated in their entireties into the present disclosure by this reference and are claimed from priority purposes.

BACKGROUND

A person's olfactory nerve can perceive odors or scents within an environment. Some odors or scents can be pleasant or attractive while others can be unpleasant or repulsive. Unpleasant odors can derive from a source, for example, the decomposition of a substance such as old food, biological tissue, or residual fluids. While air fresheners can mask an unpleasant odor or scent, an air freshener may not eliminate the source of the unpleasant odor or scent. As such, the unpleasant odor can persist after the air freshener has been exhausted.

Furthermore, unpleasant odors or scents can cause discomfort and nausea if exposure persists. Unpleasant scents or odors can also be indicative of an unsanitary or unclean environment. Accordingly, unpleasant odors or scents are undesirable to patrons and occupants of an environment.

SUMMARY

Embodiments of the invention relate to devices, systems, and methods for treating an environment to eliminate or reduce undesirable compounds.

A system for treating an environment according to at least some embodiments is disclosed. The system includes a plurality of scent control material sources and a controller operably coupled to the plurality of scent control material sources. The controller can be configured to generate a first output of scent control material from a first subset of scent control material sources of the plurality of scent control material sources. The controller can be configured to generate a second output of scent control material from a second subset of scent control material sources of the plurality of scent control material sources.

In some embodiments, the first subset of scent control material sources and the second subset of scent control material sources can have at least one scent control material source in common. The first subset of scent control material sources can include two or more scent control material sources. The second subset of scent control material sources can include two or more scent control material sources. In some embodiments, the system can include a sensor configured to measure a concentration of scent control material at a location within the environment. The controller can be configured to suspend the first output or the second output when the measured concentration of scent control material meets or exceeds a threshold. The first subset of scent control material sources can be disposed in a first region of the environment. The second subset of scent control material sources can be disposed in a second region of the environment.

A system for treating an environment according to at least some embodiments is disclosed. The system can include a first scent control material source and a second scent control material source displaced a distance from the first scent control material source. The system can further include a controller wirelessly coupled to at least one of the first scent control material source and the second scent control material source. The controller can be configured to cause the first scent control material source to discharge a first quantity of scent control material. The controller can be further configured to cause the second scent control material source to discharge a second quantity of scent control material.

In some embodiments, the controller can be configured to cause the first scent control material source to discharge the first quantity of scent control material into the environment until a scent control material concentration threshold is reached. Additionally, or alternatively, the controller can be configured to cause the second scent control material source to discharge the second quantity of scent control material into the environment until a scent control material concentration threshold is reached. In some embodiments, the controller can be configured to cause the first scent control material source to discharge the first quantity of scent control material into the environment for a first duration of time. The controller can be configured to cause the second scent control material source to discharge the second quantity of scent control material into the environment for a second duration of time. The first duration of time can different from the second duration of time. The controller can be configured to cause at least one of the first scent control material source or the second scent control material source to discharge in one or more pulses. In some embodiments, the first quantity of scent control material and the second quantity of scent control material can each include ozone.

A method of treating an environment is disclosed. The method includes dehumidifying, using a dehumidifier, the environment to a predetermined relative humidity level. The method includes, positioning a plurality of scent control material sources within the environment. The method includes, outputting a first portion of a scent control material into the environment from a first subset of scent control material sources of the plurality of scent control material sources.

The method can further include, outputting a second portion of a scent control material into the environment from a second subset of scent control material sources of the plurality of scent control material sources. The first subset of scent control material sources can be disposed at a first region of the environment. The second subset of scent control material sources can be disposed at a second region of the environment. In some embodiments, the first region can be different from the second region. The method can further include, treating the environment with traditional cleansing techniques prior to outputting the first portion of the scent control material into the environment. The scent control material can include an oxidizer composed to kill one or more pathogens in the environment.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1A:
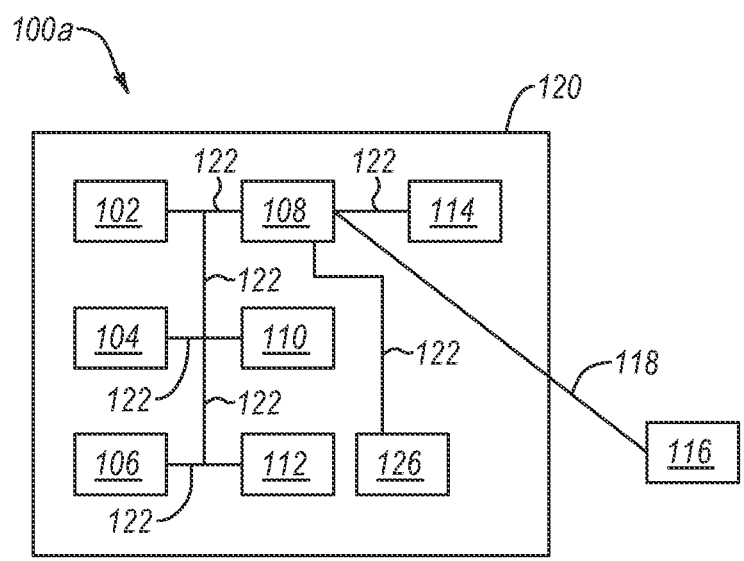
FIG. 1A is a schematic of a device for treating an environment, according to at least some embodiments.

Embodiments of the invention relate to devices, systems, and methods for treating an environment. For example, the environment can be treated by sanitizing the environment by eliminating pathogens within the environment and/or removing unpleasant odors from the environment to improve the desirability of the environment. For example, a hotel room is an environment that can include pathogens and unwanted or unpleasant odors caused by previous tenants who were not hygienic or sanitary. While the room can be cleaned after the tenants vacate, fluids, bacteria, mold, fungi, viruses, and other contaminants can remain in the ambient air, furniture, carpet, and other objects within the room. Another example of an environment that can have unwanted or unpleasant odors is a rental car. Like a hotel room, a previous renter of the vehicle can leave the interior of the vehicle odorous or unclean and therefore unfit to market to subsequent renters. A hospital room or surgical suite is another example of an environment that may need to be treated to eliminate or substantially reduce pathogens or other harmful microorganisms from the environment.

In embodiments, a device can be utilized to deodorize, purify, and/or sanitize an environment (e.g., hotel rooms, restaurants, rental vehicles, public transportation, stadiums, hospitals, etc.). As such, the term "treat" can refer to one or more of deodorizing, purifying, cleaning, and/or sanitizing an environment to eliminate contaminants, such as, pathogens and/or unpleasant odor causing bacteria. The device can be a singular unit, for example, the device can be a portable unit which can be moved from on environment to another. In an embodiment, the device can be a wall-mounted unit semi-permanently affixed in particular environment. In embodiments, the device can be defined by multiple distinct components, for example, the device can include distinct components positioned throughout a heating, ventilation, and air conditioning (HVAC) system of a hospital or stadium. The size and portability of the device can be relative to the volume of the environment that needs to be treated. Thus, a stadium may require a device integrated into the stadium's air handling system while a rental car may require a relatively small, lightweight, and portable device.

Optionally, in some examples, the devices disclosed herein can include a dehumidifier that draws moisture from the air to lower the overall humidity of the environment. For example, a fan can be used to pull ambient air within the environment past cooled coils causing moisture in the air to condense on the coils. The dehumidifier can include one or more receptacles that store the moisture drawn from the air.

The devices disclosed herein can include a scent control material source that outputs or otherwise generates a scent control material to reduce or eliminate pathogens within the environment and/or reduce or eliminate odors within the environment. For example, the scent control material source can output oxidants such as ozone. Additionally or alternatively, cyclodextrins or the like may be utilized as a scent control material to sequester scent materials or scent material sources. Scent control, as disclosed herein, includes at least partially eliminating scent(s). Scent molecules are controlled or eliminated by the devices, systems, and methods herein by reacting the scent molecules with oxidants such as ozone or other scent control material(s) to change the molecular structure of the scent molecules to reduce or eliminate scents or odors. While oxidants and oxidant sources or generators are referred to herein, it should be understood that other scent control materials (e.g., cyclodextrins, reducers such as negative ions) and scent control material sources or generators may be used alternatively or in addition to the oxidants and oxidant sources. Furthermore, although referred to as scent control material herein, the oxidants and other compounds represented as scent control material can do more than control scent, for example, the scent control materials can also sanitize or treat the environment for undesired pathogens, scent sources such as bacteria, and other microorganisms by reacting with the same to kill the microorganisms or render them inert.

The devices disclosed herein can include a humidifier that diffuses water vapor, another liquid (e.g., a fragrant scented liquid), or a combination thereof into the environment. For example, after using the dehumidifier and scent control source to eliminate or reduce pathogens, unpleasant odors, or a combination thereof form the environment. In examples, the humidifier can be used to increase the humidity of the environment and/or diffuse an antimicrobial compound having a fragrant aroma into the environment.

The devices disclosed herein can include a controller communicatively coupled to the dehumidifier, the scent control material source, and the humidifier to control the output of the device. For example, the controller can cause the dehumidifier to operate for a fixed period of time before causing the scent control material source to discharge a quantity of oxidants (e.g., ozone). In embodiments, the controller can cause the device to operate cyclically to purify, sanitize, and/or deodorize the environment, as described in more detail herein.

While described in terms of scent control, the devices, systems, and methods disclosed herein may be used to oxidize, reduce, or otherwise react with any materials in an air volume within the environment or on objects within the environment, not just to control scents. For example, the devices, systems, and methods disclosed herein can eliminate or substantially eliminate pathogens, such as viruses, bacteria, or the like within the environment. Accordingly, a device, system, or method may be able to effectively control scents in any of a myriad of environments while also eliminating harmful pathogens, such as viruses, within the environment.

The inventors have discovered that a device having an oxidant source running at a single output may be less effective in controlling scent(s) in an environment than a device that also regulates a relative humidity of the environment. For example, a device that increases the relative humidity in the environment by outputting water vapor limits exposing occupants and objects within the environment to an undesired level of scent control material or scent control material for longer than desired. The device can optionally reduce the relative humidity of the environment to increase the effectiveness of scent control material output into the environment. The devices, systems, and methods herein can effectively control scents in an environment responsive to a controlled process to efficiently eliminate or reduce scent molecules from the environment while protecting occupants and objects within the environment. Various devices and components for efficiently treating an environment are disclosed herein.

FIG. 1A is a schematic of a device 100*a*, according to at least some embodiments. The device 100*a* can be a portable scent control device or a stationary device. The device 100*a* includes a scent control material source 104, a humidifier 106, and a controller 108. In examples, the device 100*a* may optionally include a dehumidifier 102. The device 100*a* may further include at least one fan 110 operably coupled to the controller 108, a power supply 112 operably coupled to one or more components of the device 100*a*, and a user interface 114 operably coupled to the controller 108. In practice, the user interface 114 may be used to input one or more operational instructions into the device (e.g., controller 108). Alternatively, or additionally, the device 100*a* can include a remote control 116 operably coupled to the controller 108 by a wired or wireless data connection 118. The controller 108 can include one or more operational programs stored therein for controlling the components of the device 100*a*. The one or more operational programs include machine readable and executable instructions to control output of at least one of the dehumidifier 102, the scent control material source 104, the humidifier 106, or the fan(s) 110. Accordingly, the controller 108 selectively controls the output of one or more of the components of the device 100*a* responsive to an operational program of the stored operational programs.

In some embodiments, the device 100*a* and the components therein may be sized and shaped to be carried by a single person in a single unit. For example, at least some of the components of the device 100*a* may be contained within or on a single housing 120. Each of the components of the device 100*a* is discussed in more detail below.

The dehumidifier 102 dehumidifies the environment to a predetermined humidity level. As discussed herein, excess humidity can affect the amount of scent control material (e.g., ozone) required to adequately treat an environment. For example, oxidant (e.g., ozone) from the scent control material source 104 can react with water vapor (e.g., relative humidity) in the environment before the oxidant can be utilized to treat the environment (e.g., react with pathogens, scent molecules, or sources of scent molecules). The dehumidifier 102 can be used to draw water vapor from the ambient air within the environment prior to outputting the scent control material and thereby increase the efficiency of production and dispersion of the scent control material in the environment. In examples, the dehumidifier 102 can be utilized to lower the amount of relative humidity of an environment by 5% to 60%, 10% to 50%, 20% to 30%, or more than 60%.

The dehumidifier 102 can remove moisture from ambient air within the environment to lower the relative humidity of the environment. For example, the dehumidifier 102 can intake ambient air and remove moisture from the air by causing moisture in the air to condense on a set of cooled coils within the dehumidifier 102. The coils can be cooled using refrigerant, chilled water, cooled gas, or a combination thereof. The condensation can drip off the coils and into a collection tank within the device 100*a*. The contents of the collection tank can be utilized by other components of the device 100*a* (e.g., the humidifier 106). While a heat pump dehumidifier is disclosed above, other types of dehumidifiers may be utilized to reduce or maintain a relative humidity within an environment, such as desiccants, ventilator dehumidifiers, or the like.

The device 100*a* can also include a humidity sensor 126. The humidity sensor 126 can detect a relative humidity of an environment surrounding the device 100*a*. The humidity sensor 126 can be communicatively coupled to the controller 108 through, for example, a hardwired connection 122. In examples, the humidity sensor 126 can detect humidity based on a measured resistance, capacitance, or thermal variation using one or more dielectric materials, electrodes, thermistors, or a combination thereof. For example, the humidity sensor 126 can be a Honeywell HIH Series humidity sensor. The controller 108 may include programming instructions to initiate or terminate output of scent control material at a selected relative humidity level in the environment surrounding the device 100*a*. For example, outputting oxidant into the environment when the humidity is too high (e.g., above 60% relative humidity) reduces the efficacy of the oxidant to eliminate scent material, scent material sources, and pathogens.

The scent control material source 104 provides one or more oxidants, reducers, cyclodextrins, or other materials known to eliminate pathogens and/or control scent in gaseous form, vapor form, or droplet form. Gaseous oxidants may more readily disperse into an environment than vapor or droplet oxidants. The one or more oxidants may include one or more of ozone, diatomic oxygen, diatomic halogens, peroxides, radicals of any of the foregoing or components thereof, metastable oxygen, negatively charged metal oxides, encapsulated ozone, activated ozone, peracetic acid, chlorine dioxide, thixotropic gels, singlet oxygen, hypochlorite, or chlorite. Ozone and derivatives thereof (e.g., singlet oxygen, diatomic oxygen, atomic oxygen, metastable oxygen, or activated oxygen) may be particularly suitable for controlling scents (e.g., breaking down or reacting scent molecules or scent molecule sources) and eradicating pathogens within an environment. For example, ozone may be readily dispersed into an environment due to the relatively small size of ozone molecules relative to vapors or droplets of other oxidants such as most peroxides. Ozone is known to have an oxidation potential that is greater than nearly all oxidizers, with the exception of a small few such as fluorine or hydroxyl radicals. For example, ozone has been shown to react up to 10 times faster than chlorine. Additionally, ozone readily breaks down to harmless derivatives such as diatomic oxygen due to the inherent instability of the ozone molecule.

The scent control material source 104 (i.e., the oxidant source) may include an ozone generator such as corona discharge ozone generator (e.g., corona discharge plate), an ultraviolet ozone generator, an electrolytic ozone generator, or any other type of ozone generator. In some examples, the scent control material source includes an ionizer or electrostatic precipitator. The corona discharge ozone generator presents the advantages of being relatively small and efficient in comparison to other oxidant generators. The oxidant source may include a source of peroxides or derivatives thereof (e.g., hydroperoxides, hydroxyl radicals, or peroxide radicals). For example, a catalytic ionizer may provide oxidants. Catalytic ionization of air by ultraviolet light may produce a mixture of hydroxyl ions, hydroxyl radicals and hydrogen peroxide ions (as well as ozone). The oxidant source may be an activated water or peroxide ion or radical generator, such as an electrolytic device for carrying out electrolysis of one or more of water or a peroxide. The scent control material source 104 may include a fluid oxidant storage and a mist sprayer operably coupled thereto to spray a mist (e.g., droplets or micro droplets) of fluid oxidant.

In some examples, a portable reducer source may be utilized in addition to or alternately to the scent control material source 104. In such examples, the device 100a may include a reducer source such as a negative ion generator. The portable reducer source may produce hydroxide ions, nitrite ions, superoxide ions, hydrogen ions, or the like to reduce or otherwise react with scent molecules to make unrecognizable derivatives of the scent molecules. Accordingly, reference to oxidants, oxidation, scent control via oxidation or the like may be substituted for reducers, reduction, and scent control via reduction in the examples disclosed herein. The portable reducer source may include a fluid reducer storage and a mist sprayer operably coupled thereto to spray a mist (e.g., droplets or micro droplets) of fluid reducer.

The scent control material source 104 may be sized and shaped to be carried by a single person, such as in the device 100a. For example, the scent control material source 104 may include the oxidant generator, such as a corona discharge ozone generator, and the controller 108. In examples, suitable scent control material sources may include those found in the HR200, HR230, or HR300 ozone generators from Ozonics LLC, of Mason City, Iowa, U.S.A.

The humidifier 106 can diffuse water vapor, distribute water vapor, or otherwise increase the relative humidity of the environment. As discussed herein, humidity can be utilized to degrade an oxidant and thereby remove an oxidant from the environment. In examples, after the scent control material source 104 has output an oxidant for a duration of time, a reduction in the oxidant can be desirable (e.g., to avoid damaging objects within the environment). Accordingly, the humidifier 106 can be used to regulate the amount or concentration of oxidant within the environment. Furthermore, a selected amount of (e.g., relatively high) humidity within an environment can eliminate or otherwise render pathogens noninfectious. Thus, the humidifier 106 can also diminish or reduce a quantity of pathogens in the environment.

In examples, the humidifier 106 can distribute water vapor from a reservoir containing water previously removed from the ambient air using the dehumidifier 102. Additionally or alternatively, the humidifier 106 can distribute water vapor from a reservoir containing water deposited into the device 100a via a faucet or other water source.

The humidifier 106 can increase the relative humidity of the environment using a plurality of techniques. For example, the humidifier 106 can utilize a heat source that causes the reservoir to emit water vapor or steam. Alternatively or additionally, the humidifier 106 can utilize ultrasonic vibration or an impeller to produce a cool mist. It should be appreciated that this disclosure also contemplates other methods and devices, known to persons having ordinary skill in the art, that act as a humidifier to increase or maintain a relative humidity within an environment.

In examples, the humidifier 106 can include a diffusing component diffuses a chemical, compound, or other substance into the environment. For example, the diffusing component can distribute or dispense water stored within the device 100a (e.g., water collected by the dehumidifier) along with a chemical or compound (e.g., cyclodextrins, essential oils, etc.) into the environment. In examples, the chemical or compound can be scented to eliminate unpleasant odors. Additionally or alternatively, the chemical or compound can be antimicrobial or germicidal to destroy harmful microorganisms in the environment. The device 100a can include reservoirs or tanks to store the chemical or compound. In some examples, the chemical or compound can be stored with an amount of water (e.g., a pre-mixed solution). In some examples, the chemical or compound can be stored in a tank different from the reservoir or tanks that store the water.

The controller 108 may control each of the dehumidifier 102, the scent control material source 104, the humidifier 106, the at least one fan 110, the power supply 112, or the user interface 114. The controller 108 may be a part of, or separate from, the device 100a. The controller 108 may be operably coupled to the dehumidifier 102, the scent control material source 104, the humidifier 106, the at least one fan 110, the power supply 112, or the user interface 114 via a hardwired connection 122 or wireless connection. Some suitable wireless connections may include any of Wi-Fi, Bluetooth, infrared, Wi-Fi, or radio frequency connections between components of the device 100a. The hardwired connections 122 may carry one or more of power or data. Suitable hardwired connections 122 may include one or more of circuits, transistors, capacitors, resistors, electrical wiring, or any other tangible connection capable of carrying electrical bias(es) from one component to another.

The controller 108 is operably coupled to the scent control material source 104 to control generation or emission of oxidant, according to output parameters in one or more operational programs. Similarly, the controller 108 may control operation of the dehumidifier, humidifier, and fan, according to output parameters in one or more operational programs. The controller 108 includes one or more operational programs stored therein to control one or more output parameters of the scent control material source, such as an amount of oxidant produced or emitted (e.g., per unit time), emission durations, or pulse durations. The machine readable and executable instructions control output of an oxidant from the scent control material source 104, such as via selective control of electrical bias supplied to the scent control material source 104. Each of the one or more operational programs include oxidant output parameters associated with a combination of one or more conditional inputs. For example, the operational programs include machine readable instructions to output oxidant at a higher rates via higher voltage parameters than instructions to output oxidant at a lower rate. The instructions to output oxidant at higher rates may be correlated to one or more conditional inputs, such as a combination of conditional inputs, by the controller 108 (e.g., via the user interface 114). Accordingly, a combination of conditional inputs may prescribe a plurality (e.g., combination) of output parameters. Such output parameters include amount of electrical bias (e.g., voltage) delivered to the scent control material source 104 or duration of electrical bias delivered to the scent control material source 104. The output parameters may include pulsatile durations for pulsed emission of oxidant, pulse amplitude (e.g., amount of oxidant produced per unit time), durations for pulsed emission in addition to a normal operating amplitude, or pulse amplitude over a normal operating amount. The output parameters may include fan actuation, fan speed, or fan actuation duration for the fan 110. The output parameters may include a voltage delivered to the corona discharge plate (e.g., electrodes) for one or more standard or normal operation modes, such as operational modes that coincide or otherwise relate to the volume of the environment to be treated. The output parameter for the voltage delivered to the corona discharge plate may be at least 100 volts, such as 100 volts to 10,000 volts, 100 volts to 3,000 volts, 3,000 volts to 6,000 volts, 6,000 volts to 10,000 volts, less than 6,000 volts, less than 5,000 volts, at least 1,000 volts, at least 3,000 volts, or at least 4,000 volts.

The conditional inputs based on ambient characteristics may provide information to the controller 108 which may be used to select output parameters to effectively treat an environment (e.g., eliminate or reduce pathogens and scent molecules). For example, the controller 108 may have an oxidant output parameter stored therein as operational programs and automatically select the output parameters corresponding to any single or combination of the ambient characteristics of the environment, upon receiving the conditional inputs including the ambient characteristics. In examples, a normal (e.g., standard) operating mode of the scent control material source 104 may be effective in relative humidity up to 50%, but in relative humidity above 50% it may be necessary to increase the oxidant output by at least 10% such as 10%-30%, 20% to 30%, or at least 100%; while relative humidity is between 60% to 70% it may be necessary to increase oxidant output by at least 20% such as 20% to 50%, 30% to 50%, or at least 100%, in order to effectively treat the environment. Further increases in oxidant or other scent control material output may be used to effectively control scents in more humid conditions. In examples, humid conditions may also accompany relatively lower barometric pressures, which may require an additional increase in output parameters as discussed above.

An operation mode having a greater output can include a voltage having at least a 5% increase in voltage over the current operation mode, such as 5% to 80% more, 10% to 50% more, 20% to 40% more, or less than an 80% increase in voltage over the standard operation mode. The duration of any given operation may be at least 30 seconds, such as 30 seconds to 2 hours, 1 minute to 1 hour, 5 minutes to 30 minutes, 10 minutes to 20 minutes, 5 minutes to 15 minutes, less than 1 hour, or less than 30 minutes. Similar or identical output parameters or pulse durations may be used to operate a portable reducer source (e.g., negative ion generator).

The controller 108 may receive as conditional inputs one or more ambient characteristics of the environment. The ambient characteristics may include information about the environment. The ambient characteristics may include one or more of a rate of airflow, a barometric pressure, a relative humidity, a temperature, or a volume of the environment to be treated (e.g., a cubic foot approximation of a hotel room to be treated by the device 100*a*). For example, each of the foregoing may affect the efficiency of the device or the effect of oxidant (e.g., ozone) on pathogens and scent molecules in the environment. In some examples, an HVAC system or ceiling fan may disperse oxidant emitted from the scent control material source 104 faster than a base emission rate allows for effective destruction (e.g., reaction) of pathogens and scent molecules. In some examples, heat may cause oxygen molecules used to form oxidant and the oxidant to disperse and dissipate faster than in colder environments, or humidity may degrade or react with the oxidant to prevent the oxidant from reacting with pathogens, scent molecules, or sources of scent molecules. Relatively lower barometric pressure may lead to more oxidant dispersion in an environment than relatively higher barometric pressure. For example, it is currently believed that higher barometric pressure concentrates the oxygen available in the atmosphere relative to lower barometric pressure. Accordingly, it may be necessary to provide greater amounts of voltage to the corona discharge ozone generator to produce an effective amount of oxidant, when the ambient characteristics indicate lower barometric pressures. The reduced amount of oxygen for forming ozone may necessitate more voltage delivery to the corona discharge generator to produce the amount of oxidant to effectively oxidize pathogens or scent molecules (or scent molecule sources such as bacteria) to at least a level where they are not harmful to a human or detectable by a human within the environment.

In examples, the local conditions include an elevation, global positioning system (GPS) coordinates, or position of the device 100*a*. Higher elevations may lead to more oxidant dispersion (e.g., lower concentration of oxidant per unit volume of ambient air) than lower elevations, making it necessary to provide greater amounts of oxidant than at lower elevations to effectively treat an environment (e.g., oxidize pathogens, scent molecules, or scent molecule sources such as bacteria) to a level where the scent molecules are not detectable by a human or harmful to a human within the environment. Similarly, the amount of ambient oxygen available to convert to ozone using the scent control material source 104 is less than the amount at lower elevations. Accordingly, the device 100*a* may include operational programs with output parameters that provide greater oxidant output (e.g., output parameters with higher outputs such as voltage) when conditional inputs indicate that one of the ambient characteristics is a relatively higher elevation. The GPS coordinates may provide the location (e.g., position) necessary for the controller 108 to fetch data (e.g., elevation or weather) of local conditions corresponding to the location described by the GPS coordinates. The controller 108 may automatically incorporate any ambient characteristics from the data and select oxidant output parameters corresponding thereto, as described in U.S. Patent Publication No. 2019/0369576 filed 10 Jul. 2019, the disclosure of which is incorporated herein, in its entirety, by this reference. The data may be regionally specific, with GPS coordinates of a geographic region being correlated to the ambient characteristics and corresponding conditional outputs associated therewith, such as in a database.

In examples, the ambient characteristics are compared or evaluated with the scent control material source 104. Such examples may provide information as to the maximum output of the scent control material source 104. For example, some scent control material sources 104 may have a relatively higher or lower base oxidant output level than other scent control material sources. In examples, local conditions include the functional status of the scent control material source. For example, the functional status may include the efficiency of a corona discharge ozone generator as a function of voltage input into the corona discharge plates. Accordingly, the controller 108 may select output parameters to account for a reduced efficiency of the scent control material source 104 and adjust the output parameters to provide the same oxidant output levels as a 100% efficient scent control material source. For example, when the conditional inputs of the ambient characteristics indicate that a corona discharge plate(s) is operating at a decreased efficiency (e.g., only 85% or less of the voltage delivered to the discharge plates is passed between the discharge plates to produce ozone), the controller 108 may automatically select oxidant output parameters corresponding thereto to compensate for the decreased efficiency. Output parameters of any of the components of the device 100a (e.g., dehumidifier, humidifier, scent control material source, fan, etc.) may be adjusted to run at an altered (e.g., higher or lower) output to compensate for inefficiencies therein. The adjustment may be automatically implemented, by the controller 108 (or a remote input device, or a remote controller) responsive to an indication that the component is operating at less than 100% efficiency. The local conditions may include the power supply status, such as the amount of charge in a battery, or a duration of operation based on the amount of charge in the battery.

In examples, the output parameters of the one or more operational programs stored in the controller 108 are composed to direct a selected amount of oxidant output per unit time based upon the combination of the conditional inputs. For example, each conditional input may correspond to an amount of oxidant output per unit time. The controller 108 may add up the respective amounts of oxidant output per unit time corresponding to each conditional input (e.g., ambient condition) of the combination of conditional inputs to provide (e.g., run) an operational program that has oxidant output parameters that account for each conditional input (e.g., a sum of oxidant output parameters). In such a way, the device 100a may selectively emit oxidant at varying levels based on the ambient characteristics of the environment. As discussed herein, selectively emitting an output (e.g., humidity, oxidant) at varying levels can be utilized to treat an environment. For example, the environment can be treated by pulsing: the oxidant output of the scent control material source 104, the output of the dehumidifier 102, the output of the humidifier 106, the output of the fan 110, or a combination thereof.

In examples, output parameters of the one or more operational programs stored in the controller 108 are composed to direct a selected amount of oxidant output per unit time based upon the value of the oxidant output parameters corresponding to the combination of the conditional inputs. For example, a base oxidant (or other scent control material) emission rate may be at least 50 mg of oxidant (e.g., ozone) per hour ("mg/hr"), such as about 50 mg/hr to about 1000 mg/hr, about 100 mg/hr to about 500 mg/hr, about 500 mg/hr to about 1000 mg/hr, about 100 mg/hr to about 200 mg/hr, about 150 mg/hr to about 250 mg/hr, about 200 mg/hour to about 400 mg/hour, about 250 mg/hr to about 350 mg/hr, about 200 mg/hr to about 300 mg/hr, about 300 mg/hr to about 400 mg/hr, about 350 mg/hr to about 450 mg/hr, about 400 mg/hr to about 500 mg/hr, about 500 mg/hr to about 600 mg/hr, about 600 mg/hr to about 700 mg/hr, about 700 mg/hr to about 800 mg/hr, less than about 800 mg/hr, less than about 500 mg/hr, or less than about 300 mg/hr.

In some embodiments, the emission rate of the scent control material can be scaled to levels which eliminate or significantly reduce pathogens in the environment. For example, the emission rate can be at least 500 mg/hr of oxidant (e.g., ozone), such as about 500 mg/hr to about 15,000 mg/hr, about 10,000 mg/hr to about 12,500 mg/hr, about 1,000 mg/hr to about 10,000 mg/hr, about 2,500 mg/hr to about 7,500 mg/hr, about 1,500 mg/hr to about 2,500 mg/hr, about 2,000 mg/hour to about 4,000 mg/hour, about 2,500 mg/hr to about 3,500 mg/hr, about 2,000 mg/hr to about 3,000 mg/hr, about 3,000 mg/hr to about 4,000 mg/hr, about 3,500 mg/hr to about 4,500 mg/hr, about 4,000 mg/hr to about 5,000 mg/hr, about 5,000 mg/hr to about 6,000 mg/hr, about 6,000 mg/hr to about 7,000 mg/hr, about 7,000 mg/hr to about 8,000 mg/hr, about 8,000 mg/hr to about 9,000 mg/hr, about 9,000 mg/hr to about 10,000 mg/hr, about 10,000 mg/hr to about 11,000 mg/hr, about 11,000 mg/hr to about 12,000 mg/hr, about 12,000 mg/hr to about 13,000 mg/hr, about 13,000 mg/hr to about 14,000 mg/hr, about 14,000 mg/hr to about 15,000 mg/hr, less than 15,000 mg/hr, less than 10,000 mg/hr, or less than 5,000 mg/hr.

In examples, the output parameters of the one or more operational programs stored in the controller 108 are composed to direct a selected amount of oxidant output per unit time for a selected duration based upon the value of the combination of output parameters corresponding to the conditional inputs. For example, the output parameters may include an emission duration of one or more pulses of oxidant of at least a 5 second duration, such as 5 seconds to 12 hours, 30 seconds to 6 hours, 1 minute to 3 hours, 5 minutes to 1 hour, less than 6 hours, or less than one hour. The pulse durations may be at least 20 seconds, such as 20 seconds to 1 hour, 1 minute to 40 minutes, 2 minutes to 30 minutes, 3 minutes to 20 minutes, 5 minutes to 15 minutes, 5 minutes to 20 minutes, 20 minutes to 40 minutes, 40 minutes to an hour, less than an hour, less than 30 minutes, or less than 20 minutes. The pulses may be spaced by durations of any of the emission durations disclosed above. The pulses may be delivered according to the one or more output parameters of the operational programs stored in the controller. In some examples, the emission rates and amounts herein can be sufficient to provide exposure of the target (e.g., microorganism, pathogen, or scent molecule) to the scent control material of at least about 0.1 min-mg/m$^3$, such as about 0.1 mg-min/m$^3$ to about 20 mg-min/m$^3$, about 0.2 mg-min/m$^3$ to about 15 mg-min/m$^3$, about 0.3 mg-min/m$^3$ to about 10 mg-min/m$^3$, about 0.1 mg-min/m$^3$ to about 5 mg-min/m$^3$, about 3 mg-min/m$^3$ to about 7 mg-min/m$^3$, about 7 mg-min/m$^3$ to about 12 mg-min/m$^3$, less than about 20 mg-min/m$^3$, or less than 12 mg-min/m$^3$. The pulses may be selected to provide exposure of the scent control material to the target at about 0.1 ppm to about 1.5 ppm for at least 5 minutes, such as at least 0.5 ppm for at least 20 minutes in the environment.

The user interface 114 is operably coupled to the controller 108 to input one or more conditional inputs into the controller 108. In examples, the user interface 114 includes a plurality of direct inputs coupled to the device 100a. The direct inputs may be selector dials, toggles, levers, digital inputs, or other direct inputs to provide a value for a conditional input into the device 100a (e.g., the controller 108). Each of the plurality of direct inputs may correspond to one of the one or more conditional inputs such as an elevation conditional input, a barometric pressure conditional input, a relative humidity conditional input, a temperature conditional input, an input relative to the approximate volume of the environment to be treated (e.g., small, medium, large volumes), etc. For example, the user interface 114 may include a direct input (e.g., dial) for each of the conditional inputs (e.g., ambient characteristics). In such examples, the device 100a may include a dial or other input mechanism for each ambient characteristic, such as elevation, barometric pressure, relative humidity, temperature, or approximate volume. An input related to approximate volume may coincide with a volume of the environment to be treated. For example, a cabin of an automobile may coincide with a "small" approximate volume, while a large hotel room may coincide with a "large" approximate volume.

In examples, the user interface 114 may include a digital interface (e.g., a touch screen, a digital readout, one or more buttons, etc.) for inputting the ambient characteristics as conditional inputs. For example, each conditional input may have a dedicated digital interface. In examples, a single digital interface may accept each of the conditional inputs, such as via programming which allows a user to toggle through the conditional inputs to change the values thereof. For example, a user may toggle through weather data or location data inputs to provide conditional input values to one or more of the humidity or elevation. Each of the direct inputs may be located on the housing 120 such that a user may access the direct inputs. Accordingly, the user interface 114 may be located on the device 100a to directly accept conditional input.

In examples, the user interface 114 may include a data connection 118 for a network device coupled to the device 100a, such as via the controller 108. For example, the data connection 118 may include one or more of a wired connection, a Bluetooth port, an infrared port, a radio frequency port, or a Wi-Fi port, operably coupled to the controller 108. The data connection 118 may be operably coupled to the controller 108 via a hardwired connection or another wireless connection (e.g., Bluetooth) to transmit conditional inputs or other inputs to the controller 108. In examples, the network connection may include a hardwired connection, such as a Universal Serial Bus (USB) port, Firewire port, etc.

The user interface 114 may include the data connection 118 for a network device (e.g., smartphone, tablet, GPS receiver, a watch, a remote computing device, etc.) coupled to device 100a (via the remote control 116). In such examples, the network device has access to operational parameters and conditional inputs of the device 100a. For example, the network device may include a smart phone or satellite phone connected to a server or computer with conditional inputs corresponding to operation of the device 100a. For example, the conditional inputs may include one or more of an elevation conditional input, a barometric pressure conditional input, a relative humidity conditional input, a temperature conditional input, an approximate volume conditional input, or any other conditional input corresponding to operation of the device 100a. Accordingly, the device 100a may automatically access and provide conditional inputs to cause the device 100a to selectively deliver a scent control material and regulate humidity within the environment to treat the environment. In examples, the user interface 114 is implemented as hardware (e.g., dials, toggles, etc.), software (e.g., operational instructions or portions thereof which accept values of conditional inputs), or firmware. For example, the user interface 114 may be implemented and stored on the controller 108 as software or firmware. In such examples, the controller 108 may receive inputs (e.g., conditional inputs or output parameters) from a remote control 116 or remote input device and may implement the inputs via the user interface 114 in software stored on the controller 108.

The power supply 112 may be operably coupled to the scent control material source 104, the controller 108, and the at least one fan 110, or any other components of the device 100a. In examples, the power supply 112 may include a cord or wired connection for connecting to a power outlet. For example, the power supply 112 may include 110 volt, 220 volt, or similar connections. The cord may allow the user to plug the device 100a into a power outlet in a room, an extension cord, or a power station or power bank (e.g., battery pack or bank). Accordingly, the power supply 112 may include a wall outlet, the extension cord, or a power station or power bank. In examples, the power supply 112 may include both a wired connection for coupling to a power source and a battery pack. Accordingly, the device 100a may be run with our without battery power. In examples, the wired connection may be provided as a detachable power cord which may be removed from the device 100a. The wired connection may serve to recharge the battery pack and provide power to the scent control device 100a.

The power supply 112 may include one or more batteries (e.g. lithium-ion, nickel-cadmium, nickel-metal hydride, etc.) or portable chargers (e.g., power banks). The one or more batteries may be rechargeable. In examples, the one or more batteries may be modular battery packs, which may be removed and replaced. In examples, the one or more batteries have a connection for charging, such as a connection for the portable charger. In some examples, the power supply 112 may include a solar cell or a connection for a solar cell.

The power supply 112 may be a replaceable and rechargeable battery, such as a 12 volt battery. The rechargeable battery may be a lithium ion battery, lithium-ion polymer, a nickel-cadmium battery, nickel-metal hydride, lead acid, etc., batteries. The power supply 112 may include a plurality of rechargeable batteries. The rechargeable battery may be at least a 1 volt battery, such as 1.5 volts to 3 volts, 3 volts to 6 volts, 6 volts to 9 volts, 9 volts to 12 volts, 12 volts to 15 volts, 15 volts to 24 volts, greater than 12 volts, less than 24 volts, or less than 15 volts.

The controller 108 may be operably coupled to the power supply 112 or each component of the device 100a, to selectively control the delivery of power to components of the device 100a. For example, one or more operational programs may prescribe the amount and/or durations of power delivered to components of the device 100a, such as the dehumidifier 102, the scent control material source 104, the humidifier 106, the controller 108, or the fan 110. Additionally, the power supply 112 may include a controller for controlling delivery of electrical biases therefrom.

In examples, the at least one fan 110 is operably coupled to the controller 108 and positioned to propel oxidant produced in the scent control material source 104 away from the scent control material source 104. Additionally or alternatively, the at least one fan 110 is operable to circulate humidity output by the humidifier 106, draw air into the device to be dehumidified by the dehumidifier, or otherwise circulate air within the environment. In examples, the device 100a may include more than one fan, such as an intake fan, a cooling fan, an output fan, etc. Exemplary fans include microfans, centrifugal fans, cyclonic blowers, etc.

Each fan 110 may be operably coupled to the power supply 112 and the controller 108, to activate, adjust speed, and deactivate according to operational instructions. For example, an output fan may be disposed adjacent to the scent control material source to propel the oxidant therefrom. In examples, an intake fan is positioned in the device 100a adjacent to the scent control material source 104 to draw air therethrough. Such an intake fan may provide an increase in oxidant output (e.g., ozone) by drawing elemental oxygen through electrodes (e.g., corona discharge plate) of the scent control material source when compared to a scent control material source without a fan. The intake and/or output fan 110 may purge oxidant or move ambient air through the device 100a. For example, ozone may remain on the corona discharge coils of a corona discharge ozone generator. In such examples, the ozone may degrade the coils if left in place. Ozone degradation may cause the ozone generator to lose efficiency and drain the battery of the scent control device. A short purge with ambient air may help void the coils of any ozone after production of ozone is halted. The intake or output fan(s) 110 may remain in operation for at least at least 1 second after the dehumidifier 102, the scent control material source 104, or humidifier 106 has ceased operation, such as 2 seconds to 2 minutes, 3 seconds to 10 seconds, 5 seconds to 15 seconds, 10 seconds to 20 seconds, 15 seconds to 30 seconds, 2 seconds to 30 seconds, 30 seconds to 1 minute, 1.5 minutes, 1.5 minutes to 2 minutes, less than 2 minutes, or less than 1 minute. A cooling fan may be located in the device 100a to move air across the dehumidifier 102, the scent control material source 104, the humidifier 106, the controller 108, the power supply 112, or any other component of the device 100a effective to cool the component. Any of the fans 110 may be used to move ambient air through the scent control material source 104 such as to flush oxidant from the local environment or allow the oxidant to dissipate as it reacts with substances in the local environment. Such flushing may be used in pulses to limit the concentration of oxidant in an environment such as an enclosed space (e.g., a vehicle, a hotel room, or a stadium).

In examples, the at least one fan 110 may be a variable speed fan that is controllable according to an operational program, the user interface 114, or the remote control 116. For example, an operational program corresponding to a first set of conditional inputs may have a different (e.g., higher or lower) fan speed than a second operational program corresponding to a second set of conditional inputs.

One or more components of the device 100a may be contained in the housing 120. For example, each of the dehumidifier, the scent control material source, the humidifier, the controller, the power supply, the at least one fan, the data connection, or the user interface may be disposed within or on the housing 120. The housing 120 may be made of a polymer (e.g., high density polyethylene, high density polystyrene, or polycarbonate), a composite (e.g., fiberglass or carbon fiber), a metal (e.g., steel, aluminum, alloys), a ceramic or cermet, any other material capable of withstanding impacts and preventing crushing of the contents of the housing 120, or combinations of any of the foregoing.

In examples, the housing 120 includes one or more discontinuities defining air intakes, output ports (e.g., oxidant outlet port), or device ports (e.g., hole for user interface, hole for electrical inputs, hole for battery port). For example, the housing may include a hole positioned and sized to accommodate a battery therein. In such examples, the power supply may include a replaceable battery pack and the hole (e.g. port) may accommodate removal and replacement of battery packs. In examples, the one or more discontinuities define a grill for an air intake or an output port.

In examples, the device 100a includes the remote control 116 operably coupled thereto. The remote control 116 communicates to the data connection 118 and controller 108 via wireless signals, such as Bluetooth, Wi-Fi, RF, infrared, etc. signals. The remote control 116 is operably coupled to the controller 108 via the data connection 118 which may include a Bluetooth transceiver, a Wi-Fi transceiver, an RF transceiver, or infrared transceiver to receive the wireless signals. In examples, the wireless signals from the remote control 116 may initiate or terminate generation of oxidant, adjust an amount of oxidant output from the scent control material source 104, input the one or more conditional inputs, or initiate or terminate operation of the humidifier or dehumidifier. For example, the remote control 116 may include one or more inputs, such as buttons, switches, or toggles, for activating the device 100a, deactivating device 100a, selecting a mode of operation, increasing or decreasing an output of the device 100a, entering one or more conditional inputs into the controller 108, or directing any other operation of the device 100a. The remote control 116 may include one or more of a cellular phone, a laptop, a tablet, a proprietary remote control configured to specifically communicate with the controller 108, a smart watch, a GPS device, or the like. For example, the remote control 116 may be a cellular phone, tablet, watch, or other electronic device storing executable application software with operational program, mode selection, and output parameter customization options. In such examples, the user interface 114 may be at least partially incorporated into the remote control 116, such as in application software stored thereon.

In some examples, the controller 108 may be configured with a simplified memory and processor. The simplified memory may store a plurality of preset output parameters, such as in operational programs, which are executable by the processor, such as in hardware, firmware, or software format. In such examples, the user interface 114 may be at least partially incorporated into the controller 108 or the remote control 116. The remote control 116 or buttons, toggles, levers, or user interface on the device 100a may be used to select the preset output parameters or initiate operational output. For example, the remote control 116 may be used to initiate a preset program stored in the controller 108 and corresponding to preset output parameters, make and output operational programs corresponding to one or more output parameters selected by the remote control 116, set output parameters of any of the components of the device 100a, or terminate or suspend operation of any of the components of the device 100a. The remote control 116 may be used to initiate a preset program stored in the remote control 116 and corresponding to preset output parameters, make and output operational programs corresponding to one or more output parameters selected via the remote control 116 or remote input device, set output parameters of any of the components of the device 100a, or terminate or suspend operation of any of the components of the device 100a.

Responsive to input from the remote control 116, the controller 108 (e.g., processor, firmware, or software therein) may initiate operation of one or more portions of the device 100a at selected output parameters. In some examples, the selected output parameters may be determined outside of the controller 108, such as in the remote control 116 (e.g., cellular phone) or a remote computing system. In such examples, the controller 108 may store executable preset output parameters corresponding to the output parameters selected in operational programs provided by the remote control 116. Accordingly, in some examples, the controller 108 may be a simplified version configured not to determine and select operational programs or output parameters, but instead to rely on the remote control 116 to provide the instructions for running at certain output parameters according to selected operational programs or output parameters determined on the remote control 116.

In some examples, the device 100a includes a scent control material source and a controller that is operably coupled to one or more remote networks for communicating conditional inputs to the device 100a via a remote input device. In some examples, the scent control material source can includes a negative ion generator. The device 100a may be used as a system for automatically adjusting output parameters according to local conditions of the device 100a. Such systems include remote computer network connections to provide conditional inputs corresponding to the local conditions.

Figure 1B:
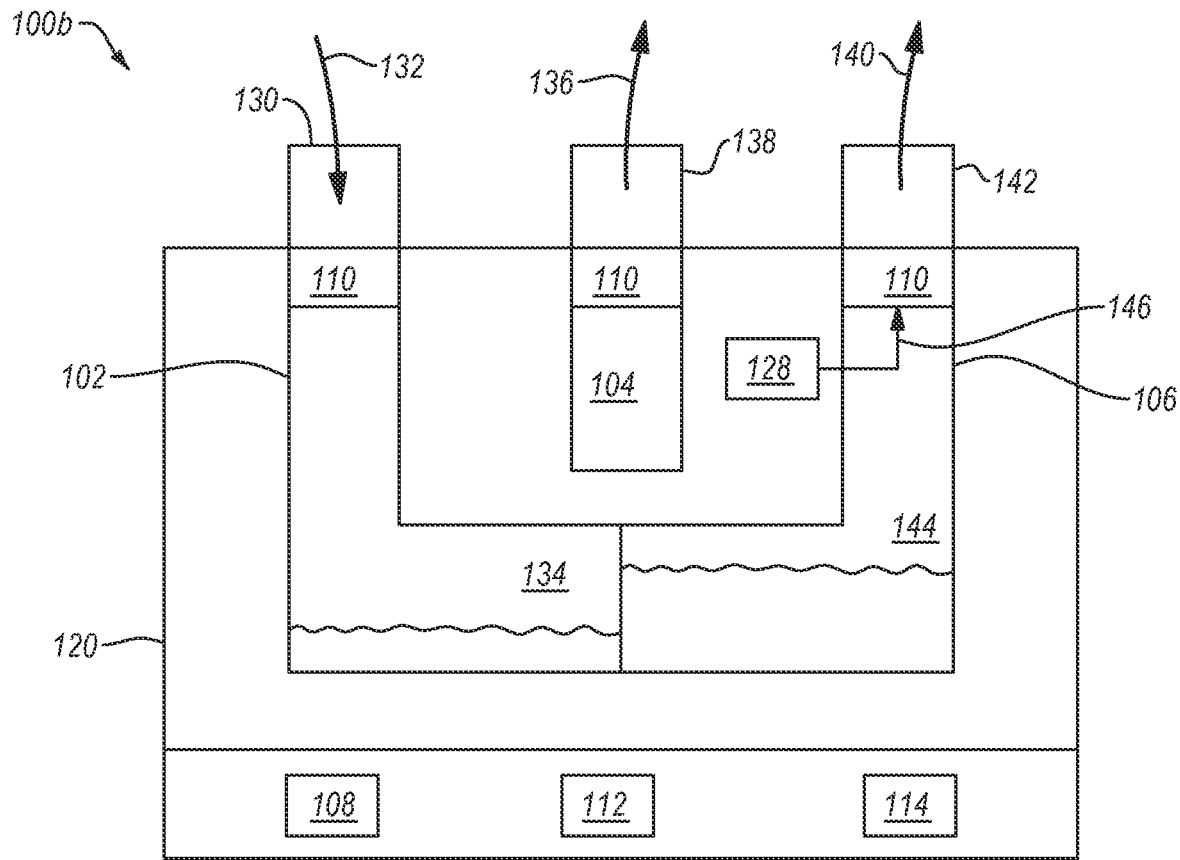
FIG. 1B is an illustration of a device for treating an environment, according to at least some embodiments.

FIG. 1B is an illustration of the device 100b, according to at least some embodiments. The device 100b and components thereof can be similar or identical to the device 100a of FIG. 1A and components thereof in one or more aspects. For example, the device 100b may be a configuration of the device 100a. In this illustrated embodiment, the device 100b includes a scent control material source 104, a humidifier 106, a controller 108, fans 110, a power source 112, and a user interface 114. The device 100b can optionally include a dehumidifier 102 and a diffusing component 128.

The dehumidifier 102 can dehumidify ambient air drawn into an inlet 130 of device 100 (as represented by arrow 132). Moisture removed from the ambient air can be stored in a first reservoir 134 in fluid communication with the dehumidifier 102. Accordingly, the relative humidity in the environment can be selectively controlled. For example, production of ozone is most efficiently carried out at lower relative humidity.

The scent control material source 104 can output a scent control material (as represented by arrow 136) from a scent control outlet 138 of the device 100b. The humidifier 106 can output moisture or water vapor into the environment (as represented by arrow 140) using a humidifier output 142 of the device 100. The humidifier 106 can be in fluid communication with a second reservoir 144. The second reservoir 144 can be separate from the first reservoir 134 or part of the first reservoir 144. The fluid (e.g., water) in the humidifier may be separated from the fluid collected in the dehumidifier 102. Accordingly, scent molecules, scent sources, and pathogens collected by the dehumidifier in the first reservoir 134 may be isolated from the fresh, uncontaminated fluid in the second reservoir 144. Thus, the water vapor (e.g., humidity) output from the humidifier 106 is substantially free of contaminants.

Ozone is more readily broken down into active components (e.g., hydroxyl ions, hydroxyl radicals, etc.) at relatively higher humidity. For example, in the presence of water, ozone tends to decompose to hydroxyl radicals and ions. Hydroxyl radicals are more active than even ozone in reacting with most organic molecules. Accordingly, the hydroxyl radicals are more effective than even ozone at reacting with (e.g., decomposing, destroying, rendering inert) the scent molecules, scent source, or pathogens. Thus, by adding humidity after producing the scent control material at a lower humidity, the systems and methods herein provide for efficient production of oxidizers (e.g., ozone) in combination with heightened activation of the oxidizers with the elevated humidity.

In examples, the diffusing component 128 can emit or diffuse a chemical or compound through the humidifier outlet 142 (as represented by arrow 146). Alternatively or additionally, the diffusing component 128 can emit or diffuse a chemical or compound out of a distinct outlet of the device 100b.

In examples, one or more of the fans 110 are operably coupled to the controller 108 and positioned to propel scent control material produced in the scent control material source 104 away from the scent control material source 104. Additionally or alternatively, one or more of the fans 110 are operable to circulate humidity output by the humidifier 106, draw air into the device to be dehumidified by the dehumidifier, or otherwise circulate air within the environment.

The device 100b can include the humidity sensor 126 as disclosed above with respect to device 100a of FIG. 1A. The devices 100a and 100b are referred to herein collectively as device 100.

While depicted as including a humidifier and dehumidifier, in some examples the devices 100a and 100b may not include one or more of the humidifier or dehumidifier. In such examples, control of the oxidant generation and output, one or more fans, and air flow or pressure in the environment may be utilized (e.g., manipulated) to treat the environment. Such treatment provides selective control of the concentration of ozone (or other oxidant) within the environment to treat scents or to eliminate biological material or pathogens such as viruses or bacteria, mold, and so on. As explained in more detail below, such control may include selectively elevating the concentration of ozone within the environment to a selected level and then terminating output of ozone for a selected duration before repeating the cycle the same concentration or a smaller concentration. Application or circulation of air in the environment then aids in causing the ozone in the environment to react with the air or moisture therein to reduce the concentration of ozone and treat the environment with the ozone.

Figure 2:
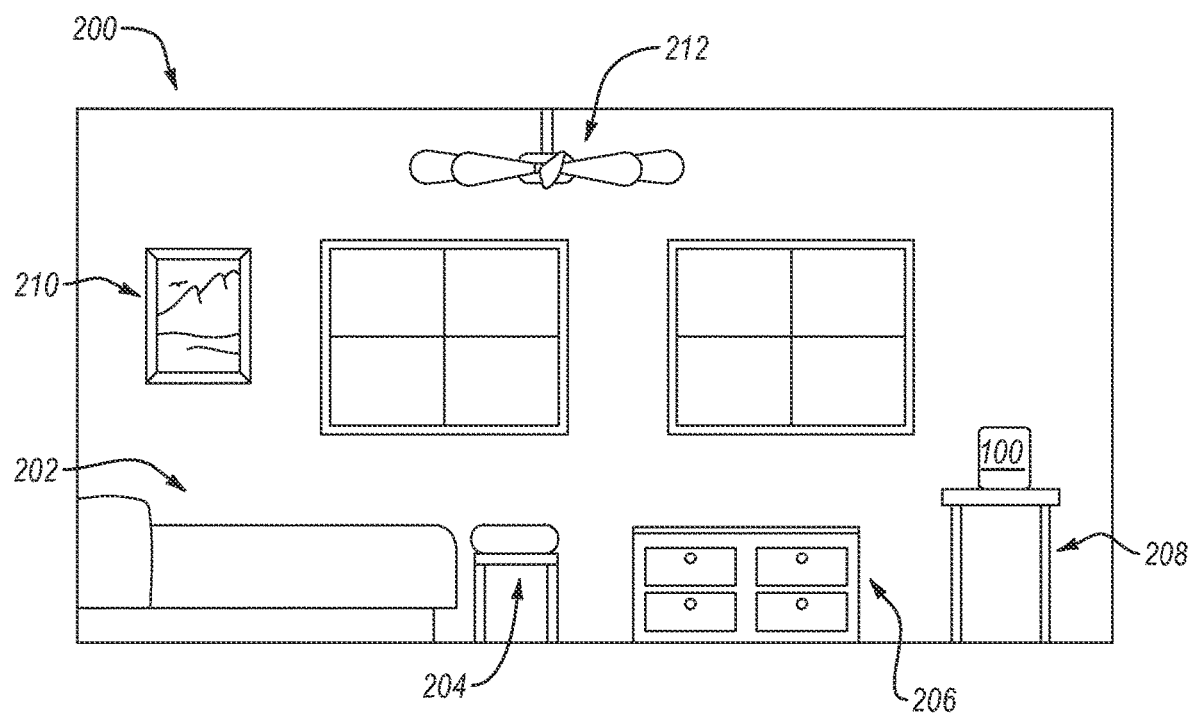
FIG. 2 is an illustration of the device of FIG. 1A or 1B in an environment, according to at least some embodiments.

FIG. 2 is a schematic of the device 100 in an environment 200, according to at least some embodiments. The device 100 may be similar or identical to the device 100a or 100b in one or more aspects. While the environment 200 is depicted as a hotel room or a bedroom, it should be appreciated that the device 100 disclosed herein and the methods disclosed herein can be utilized to treat a number of various environments. For example, some examples of applicable environments include motor vehicles, airplanes, trains, stadiums, classrooms, libraries, office spaces, residential living spaces, commercial buildings, and the like.

The environment 200 can include a plurality of objects (e.g., furniture, bedding, textiles, carpeting, equipment, etc.) that are treated with the environment 200. For example, the environment 200 can include a bed 202 (including a mattress, pillows, a comforter, and so on), an ottoman 204, a dresser 206, a desk or table 208, artwork or decorations such as a painting or picture 210, and a ceiling fan 212. Each of these objects can contain scent molecules or sources of scent molecules such as smoke, biological material or pathogens such as viruses or bacteria, mold, and so on. Exposure to an oxidant can reduce or eliminate pathogens in the environment and unpleasant odors originating from objects within the environment 200. However, too long of exposure to oxidants, such as ozone may degrade or damage some materials. Further, some health organizations or governmental agencies advise against overexposure to some scent control materials such as ozone.

The device 100 can include a dehumidifier (e.g., dehumidifier 102) operative to decrease a relative humidity of the environment 200. For example, the dehumidifier can decrease the relative humidity within the environment 200 to a predetermined or desired value. The predetermined or desired value can be input and otherwise modified by a user of the device 100 (e.g., input through the user interface 114). Alternatively or additionally, the dehumidifier can be operable to dehumidify the environment 200 for a duration of time to lower or decrease the relative humidity within the environment 200. In examples, the dehumidifier can operate for multiple periods of time. For example, the dehumidifier can operate for a first duration of time, suspend operation while another component of the device 100 (e.g., the scent control material source) operates, and then operate for a second duration of time. The first and second durations of time can be equivalent or different. In other words, the controller of the device 100 can operate each component of the device cyclically or otherwise in a progression wherein each component can be operated numerous times during the progression for varying durations of time.

The dehumidifier can operate in conjunction with a fan (e.g., the at least one fan 110) to draw ambient air within the environment 200 into the device 100. The fan can be used to draw ambient air across cooled coils of the dehumidifier which accumulate moisture from the ambient air. Alternatively or additionally, the ceiling fan 212 can be utilized to circulate air within the environment 200 and thereby generate airflow to the dehumidifier or the device 100.

The device 100 can include a scent control material source (e.g., scent control material source 104) operative to output a scent control material (e.g., an oxidant, hydroxide ions, nitrite ions, superoxide ions, hydrogen ions, cyclodextrins, and the like) into the environment 200 to eliminate or reduce pathogens, scent molecules, and sources of scent molecules from the environment 200. The scent control material can be discharged from the device 100 at a constant output for a duration of time or at an output which varies over the duration of time. For example, the scent control material source can initially output large quantities of scent control material to quickly increase a concentration of scent control material (e.g., oxidant) within the environment 200. After the environment 200 has been inundated with scent control material, the quantity or amount of scent control material being output to the environment 200 can be reduced to maintain a desired concentration of scent control material within the environment 200. As described herein, the scent control material source can operate for multiple durations of time. For example, the scent control material source can output a first quantity of scent control material (e.g., ozone) for a first duration of time, suspend operation while another component of the device 100 operates (e.g., the dehumidifier), and output a second quantity of the scent control material for a second duration of time. In this example, the first and second quantities or amounts of the scent control material can be equivalent or different. Similarly, the first and second durations of time can be equivalent in length or different in length.

As described herein, the scent control material source can include one or more fans to distribute the scent control material throughout the environment 200. Additionally or alternatively, the ceiling fan 212 or another source for circulating air (e.g., a blower motor of an HVAC system) can be utilized to circulate or otherwise distribute the scent control material within the environment 200. A quantity of scent control material can be discharged into the environment 200 to maintain a concentration of scent control material sufficient to eliminate or otherwise substantially reduce not only pathogens and scent molecules within the environment, but also the sources of scent molecules on objects within the environment 200. Furthermore, by cyclically treating the environment 200 using the device 100, pathogens, scent molecules, and sources of scent molecules that were untreated during a first step or phase of the cycle can be treated within a second step or subsequent steps of the cycle.

The device 100 can include a humidifier (e.g., humidifier 106) operative to increase a relative humidity within the environment 200. For example, the humidifier can increase the relative humidity within the environment 200 to a predetermined or desired value. The predetermined or desired value can be input and otherwise modified by a user of the device 100 (e.g., input through the user interface 114).

Alternatively or additionally, the humidifier can be operable to humidify the environment 200 for a duration of time to raise or increase the relative humidity within the environment 200. In examples, the humidifier can operate for multiple periods of time. For example, the humidifier can operate for a first duration of time, suspend operation while another component of the device 100 (e.g., the scent control material source) operates, and then operate for a second duration of time. The first and second durations of time can be equivalent in length or different in length.

The humidifier can increase the relative humidity of the environment 200 in a number of ways, for example, the humidifier can include a heat source that heats a reservoir and thereby produces a water vapor or steam. Alternatively or additionally, the humidifier can utilize ultrasonic vibration or an impeller to produce and output a cool mist into the environment.

The humidifier 102 can include a diffusing component (e.g., a diffuser) configured to diffuse a chemical, compound, or other substance into the environment 200. For example, the diffusing component can distribute or dispense water stored within the device 100 (e.g., water collected by the dehumidifier) simultaneously with a chemical or compound (e.g., cyclodextrins, essential oils, a fragrant, etc.) into the environment 200. Alternatively or additionally, the diffusing component can be configured to diffuse a chemical or compound without simultaneously distributing or dispensing water. In examples, the chemical or compound can be scented or fragrant to provide a pleasant aroma to the environment 200. The device 100 can include reservoirs or tanks to store the chemical or compound utilized by the diffusing component. In some examples, the chemical or compound can be stored with an amount of water (e.g., a pre-mixed solution). In some examples, the chemical or compound can be stored in a tank different from the reservoir or tanks that store water for the humidifier.

Operational parameters of the diffusing component can be input or otherwise modified by a user of the device 100 (e.g., input through the user interface 114). Like other components of the device 100, the diffusing component is communicatively coupled to the controller (e.g., the controller 108). The controller can dictate operational parameters of the diffusing component. For example, the controller can dictate a duration of time the diffusing component outputs the chemical or the quantity of chemical output by the diffusing component.

Residual scent control material within the environment 200 can be odorous such that occupants of the environment can detect the presence of scent control material. Moreover, some forms of scent control material, such as ozone, can damage objects within the environment 200 subjected to prolonged exposure to the scent control material. The humidifier and/or diffusing component can remove or reduce the scent of the residual scent control material (e.g., ozone) within the environment 200 to reduce odors associated with the scent control material and protect objects within the environment 200.

The humidifier can operate in conjunction with a fan (e.g., the at least one fan 110) to distribute water vapor or another output of the humidifier (e.g., an output of the diffuser) to the ambient air within the environment 200. Alternatively or additionally, the fan can be used to draw ambient air across heated coils of the humidifier that deposit moisture into the ambient air. The ceiling fan 212 can be utilized to circulate air within the environment 200 and thereby generate airflow to the humidifier. In examples, the ceiling fan 212 or another source for circulating air within the environment can be used to distribute or disseminate water vapor throughout the environment 200.

As described above, the device 100 includes the dehumidifier 102, the scent control material source 104 (e.g., oxidant generator), the humidifier 106, the controller 108, the at least one fan 110, the power supply 112, the user interface 114, the data connection 118, the housing 120, and the remote control 116. In some examples, one or more of the above-noted components may be omitted from the device 100. For example, the device may not include the remote control 116. The controller 108 is operably coupled to the scent control material source 104 (e.g., oxidant generator) and the controller 108 includes one or more operational programs stored therein to control output of an oxidant (e.g., ozone) from the device 100.

Figure 3:
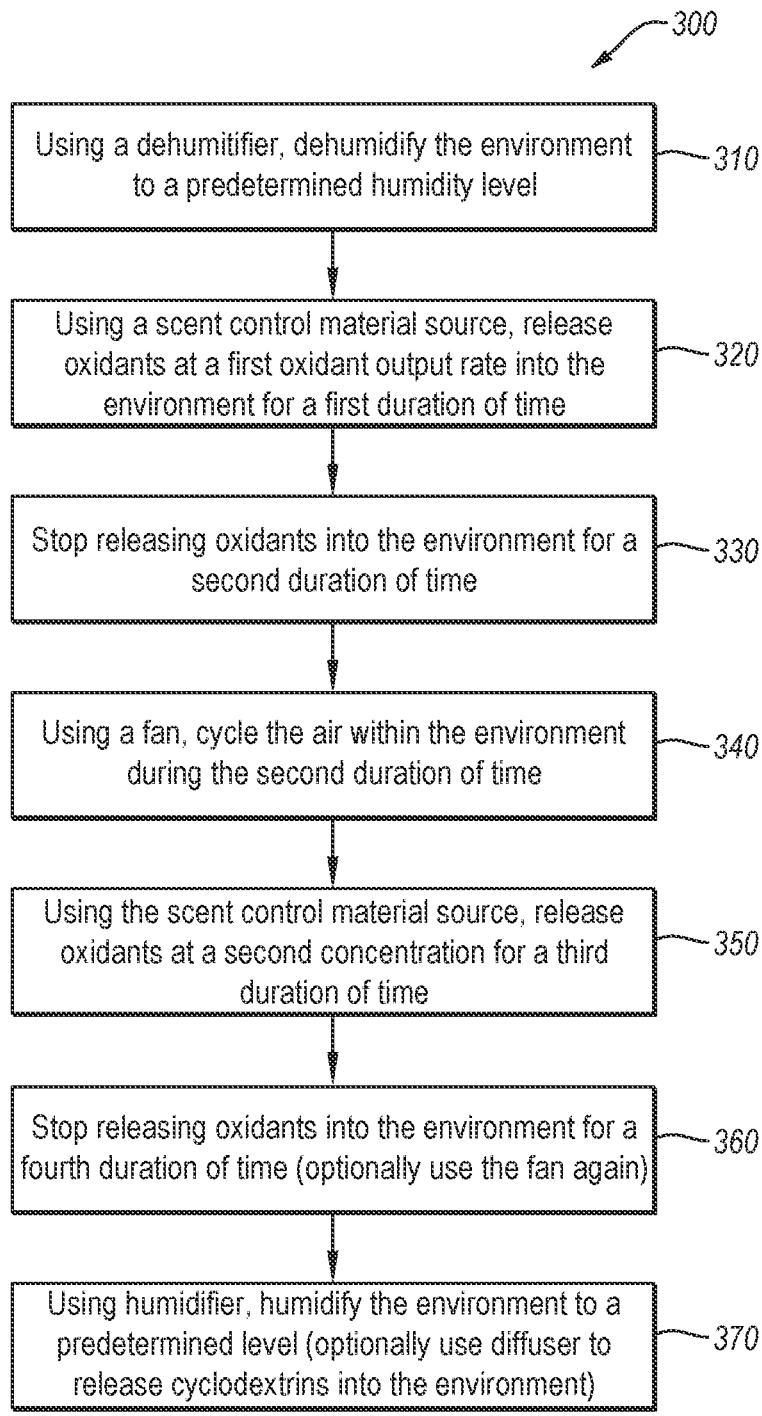
FIG. 3 is a flow diagram of treating an environment using the device, according to some embodiments.

FIG. 3 is a flow diagram of a method 300 of treating an environment, according to at least some embodiments. The method 300 includes the act 310 of using a dehumidifier to dehumidify the environment to a predetermined relative humidity level. The method 300 includes the act 320 of using a scent control material source to release oxidants (e.g., ozone) at a first oxidant output rate into the environment for a first duration of time. The method 300 includes the act 330 of temporarily decreasing the first oxidant output rate into the environment for a second duration of time. The method 300 includes the act 340 of using a fan to cycle ambient air within the environment during the second duration of time. The method 300 includes the act 350 of using the scent control material source to release oxidants (e.g., ozone) at a second oxidant output rate into the environment for a third duration of time. The method 300 includes the act 360 of temporarily decreasing the second oxidant output rate into the environment for a fourth duration of time. The method 300 includes the act 370 of using a humidifier to increase a relative humidity level of the environment.

Accordingly, the method 300 may treat an environment to eliminate or mask scents or sources of scents within the environment. The method 300 may include more or fewer acts than the acts 310-370. For example, the method 300 may not include one or more of the act 310, 340 370. In other words, acts 310 and 330-370 are optional and therefore need not be implemented to treat an environment using the method 300. Instead, acts 310 and 330-370 are additional acts that provide additional functions for the method 300.

The method 300 includes the act 310 of using a dehumidifier to dehumidify the environment to a predetermined relative humidity level. The dehumidifier may be the dehumidifier 102 (FIG. 1A) disclosed herein. Similarly, the scent control material source of acts 320 and 350 may be the scent control material source 104 (FIG. 1A), or any other scent control source disclosed herein. The humidifier may be the humidifier 106 (FIG. 1A) disclosed herein. The fan may be the at least one fan 110 (FIG. 1A) disclosed herein. In examples, the method 300 may include any components of any of the devices disclosed herein. For example, the method 300 may include the user interface or remote control as disclosed herein. The user interface may receive one or more inputs from a user or the remote control.

The method 300 includes the act 310 of using a dehumidifier to dehumidify the environment to a predetermined relative humidity level. The dehumidifier can remove moisture from ambient air within the environment to lower the relative humidity of the environment. The predetermined relative humidity level can be input by a user or dictated by a controller. For example, the predetermined relative humidity level can be a threshold set by the controller. Operation of the dehumidifier can be based on an output of one or more humidity sensors, for example, operation of the dehumidifier can stop when an output of the one or more humidity sensors substantially matches the threshold (i.e., the predetermined relative humidity level).

The method 300 includes the act 320 of using a scent control material source to release oxidants (e.g., ozone) at a first oxidant output rate into the environment for a first duration of time. As disclosed herein, the scent control material source can also or alternatively emit or distribute other scent control materials (e.g., reducers, ions, cyclodextrins, etc.). The scent control material source can output scent control material at varying quantities for various durations of time. For example, the scent control material may be output in pulses as disclosed herein.

The method 300 includes the act 330 of temporarily decreasing the first oxidant output rate into the environment for a second duration of time. The first oxidant output rate may be decreased by a percentage such that an overall concentration of scent control material within the environment does not decrease below a predetermined concentration value.

The method 300 includes the act 340 of using a fan to cycle ambient air within the environment during the second duration of time. The fan can be portable (e.g., the one or more fans 110 of device 100) or otherwise provided, including being previously associated with the environment (e.g., ceiling fan 212).

The method 300 includes the act 350 of using the scent control material source to release oxidants (e.g., ozone) at a second oxidant output rate into the environment for a third duration of time.

The method 300 includes the act 360 of temporarily decreasing the second oxidant output rate into the environment for a fourth duration of time. The second oxidant output rate may be decreased by a percentage such that an overall concentration of scent control material within the environment does not decrease below a predetermined concentration value. One or more fans may be used to cycle ambient air within the environment during at least one of the first, second, third, or fourth durations of time.

The method 300 includes the act 370 of using a humidifier to increase a relative humidity level of the environment. For example, the relative humidity level of the environment can be restored to the environments original relative humidity prior to act 310. The method can also include diffusing or distributing a chemical or compound from a diffusing component of the humidifier.

Figure 4:
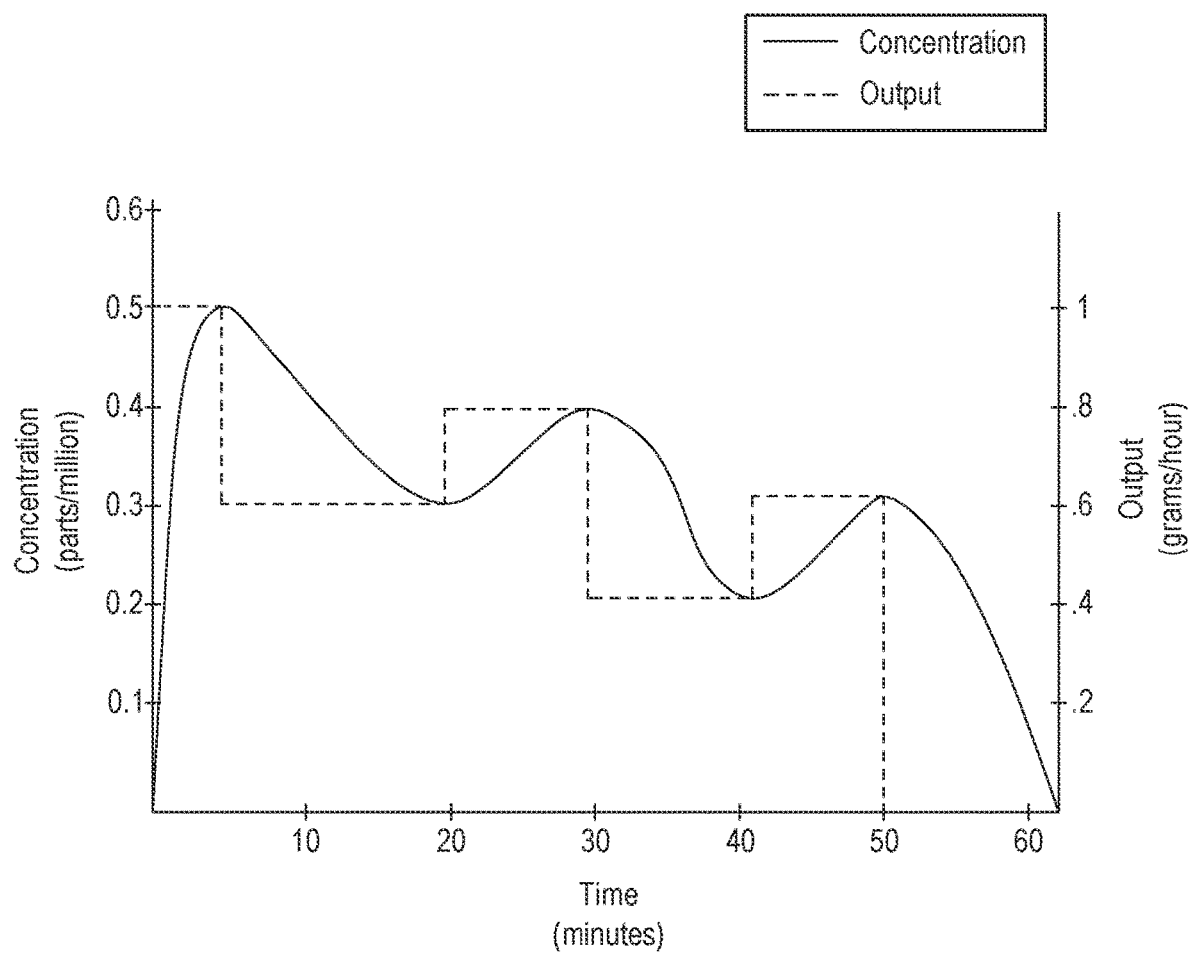
FIG. 4 is a graphical illustration of a treatment wherein a concentration of scent control material within an environment is varied over time, according to at least some embodiments.

FIG. 4 is a graphical illustration of a treatment wherein a concentration of scent control material within an environment is varied over time, according to at least some embodiments. The graphical illustration also depicts an output over time of the scent control material source in grams/hour. The graphical illustration correlates with one or more of the acts (e.g., acts 310-370) of method 300 described herein. It should be appreciated that the output values, concentration values, and durations of time described within FIG. 4 are provided for illustrative purposes and should not be interpreted or construed to limit the scope of the present disclosure in any way.

During the first five minutes of the treatment, the output of the scent control material source is relatively high (e.g., at or above 1 grams/hour). A relatively high output from the scent control material source can flood or inundate the environment with scent control material (e.g., ozone). Thereby rapidly increasing a concentration of scent control material within the environment. After the environment has been exposed to a relatively high output from the scent control material source for a first duration of time (e.g., five minutes), output from the scent control material source can be reduced, for example, from 1 grams/hour to 0.6 grams/hour for a second duration of time (e.g., the fifteen minutes between about the five-minute mark and about the twenty-minute mark). As illustrated, the concentration of scent control material within the environment decreases when the output from the five-minute mark to the twenty-minute mark. For example, the concentration of scent control material within the environment drops from 0.5 parts per million at the five-minute mark to 0.3 parts per million at the twenty-minute mark.

The decrease in concentration of scent control material within the environment can correlate with the reduction in scent control material output. Additionally or alternatively, the decrease in concentration of scent control material within the environment can correlate to the scent control material (e.g., ozone) interacting with pathogens, scent molecules, or sources of scent molecules within the environment. Additionally or alternatively, the decrease in concentration of scent control material within the environment can be a result of operating a humidifier (e.g., the humidifier 106) for at least a portion of the duration of time between the five-minute mark and twenty-minute mark. As described herein, humidity can modify or destroy at least some types of scent control material, for example, humidity can destroy or modify ozone molecules. Ozone is soluble in water and decomposes upon contact with water vapor present in humid environments. Further, oxidants or reducers in scent control material may react with water to reduce or oxidize water molecules to form hydroxide, hydronium, or other aqueous ions, which may be less reactive than the scent control material.

At about the twenty-minute mark, output of the scent control material source can be increased, for example, from 0.6 grams/hour to 0.8 grams/hour for a third duration of time (e.g., from the twenty-minute mark to the thirty-minute mark). In examples, at least one fan (e.g., the at least one fan 110 of the device 100) can be utilized to circulate the scent control material source throughout the environment. As a result, the concentration of scent control material within the environment can increase from 0.3 parts per million to 0.4 parts per million.

At about the thirty-minute mark, the output of the scent control material source can be reduced or decreased. For example, as shown in FIG. 4, an output of the scent control material source can be reduced from 0.8 grams/hour to 0.4 grams/hour for a fourth duration of time (e.g., the ten minutes between the thirty-minute mark and the forty-minute mark). Optionally, the humidifier (e.g., the humidifier 106) can be utilized for at least a portion of the fourth duration of time to modify or destroy at least the scent control material within the environment.

At about the forty-minute mark, output of the scent control material source can be increased, for example, from 0.4 grams/hour to 0.6 grams/hour for a fifth duration of time (e.g., from the forty-minute mark to the fifty-minute mark). In examples, at least one fan (e.g., the at least one fan 110 of the device 100) can be utilized to circulate the scent control material source throughout the environment. As a result, the concentration of scent control material within the environment can increase from 0.2 parts per million to 0.3 parts per million.

In a final duration of time (e.g., the time after the fifty-minute mark), the humidifier can optionally be utilized to increase the relative humidity of the environment. In examples, the humidifier can be utilized to restore the relative humidity of the environment to an initial relative humidity of the environment before the method 300 was undertaken. In examples, the humidifier can be used to increase the relative humidity of the environment above the initial relative humidity of the environment. As described herein, the humidifier can reduce a scent of the residual scent control material within the environment and/or protect objects within the environment from corrosive effects of residual scent control material. Additionally or alternatively, a diffuser can be utilized during the final duration of time to diffuse a chemical or other compound into the environment, for example, an essential oil having a fragrant aroma can be diffused throughout the environment.

As explained in more detail below, treating an environment may include selectively elevating the concentration of oxidant (e.g., ozone) or another scent control material within the environment to a selected level and then terminating output of oxidant for a selected duration before repeating the cycle at the same concentration or a smaller concentration. Such treatment may also include controlling one more of the humidity, airflow, or air pressure in the environment. Controlling such additional parameters provides selective control of the concentration of the oxidant in the environment. For example, providing negative pressure in an environment (e.g., via an HVAC system) may cause the oxidant to be pulled from the environment, such as prior to sanitization with the all of the oxidant. In rooms, a cold air return may cause the oxidant concentration to decrease due to removal from the room. Similarly, hot air or air conditioning input into the environment may cause the oxidant concentration to decrease due to interaction with moisture or other components in the input air.

As shown in FIG. 4, the process of increasing and decreasing output of the scent control material source to vary a concentration of the scent control material source in an environment can be repeated to effectively treat the environment. The periodic or cyclical process can protect objects within the room from damage by constant exposure to a high concentration of scent control material. Additionally or alternatively, periodically or cyclically treating an environment using the method disclosed herein can keep the environment under a safety threshold to keep the environment safe for occupation (e.g., an Environmental Protection Agency threshold for ozone exposure). A cyclical or periodic treatment process can also be more effective in destroying pathogens, scent molecules, and their sources. For example, a cyclical process can allow the scent control material to permeate objects in the environment and thereby destroy the source of the unwanted scent(s) or pathogen(s).

The parameters and attributes associated with the graphical illustration of a treatment shown in FIG. 4 is only one example embodiment of a treatment. Accordingly, it should be appreciated that the output of the scent control device, the concentration values within the environment, and each duration of time can be modified or varied to sufficiently treat an environment. For example, the durations may be at least 1 second (s), such as 1 s to 5 hours, 1 s to 1 minute, 1 s to 30 s, 1 minute to 3 minutes, 3 minutes to 20 minutes, 10 minutes to 30 minutes, 1 hour to 5 hours, 2 hours to 4 hours, less than 5 hours, or more than 5 hours. The durations may be similar or identical to each other. The durations may differ from each other. Any number of durations may be used for producing or pausing after producing scent control material. In example, the parameters and attributes of the cyclical treatment can be increased to treat a larger environment (e.g., a stadium) and decreased to treat a smaller environment (e.g., a motor vehicle). As such, the present disclosure has much broader scope than the mere examples utilized to describe FIG. 4. Consequently, the example values and number of cycles described in relation to FIG. 4 should not be read to limit the scope of this disclosure in any manner. For example, any number of cycles and any combination of output rates and durations may be used to provide any of the exposure amounts disclosed herein to the scent source(s), pathogen(s), or scent molecule(s).

The cyclical treatment shown in FIG. 4 may additionally include controlling humidity, such as adding or removing humidity to cause ozone to interact with scent source(s), pathogen(s), or scent molecule(s) or the like in the environment or to interact with moisture in the air to cause at least some of the ozone to convert to hydroxyl radicals, hydroxyl ions, or less reactive forms of water. Accordingly, the concentration of oxidants such as ozone may be selectively controlled via pulses of oxidant generation/application separated by periods of inactivity, controlled circulation of air, or application of humidity. In examples where humidity is applied after input of oxidant, the concentration of the oxidant may fall more sharply (e.g., faster) than is shown in FIG. 4.

Figure 5A:
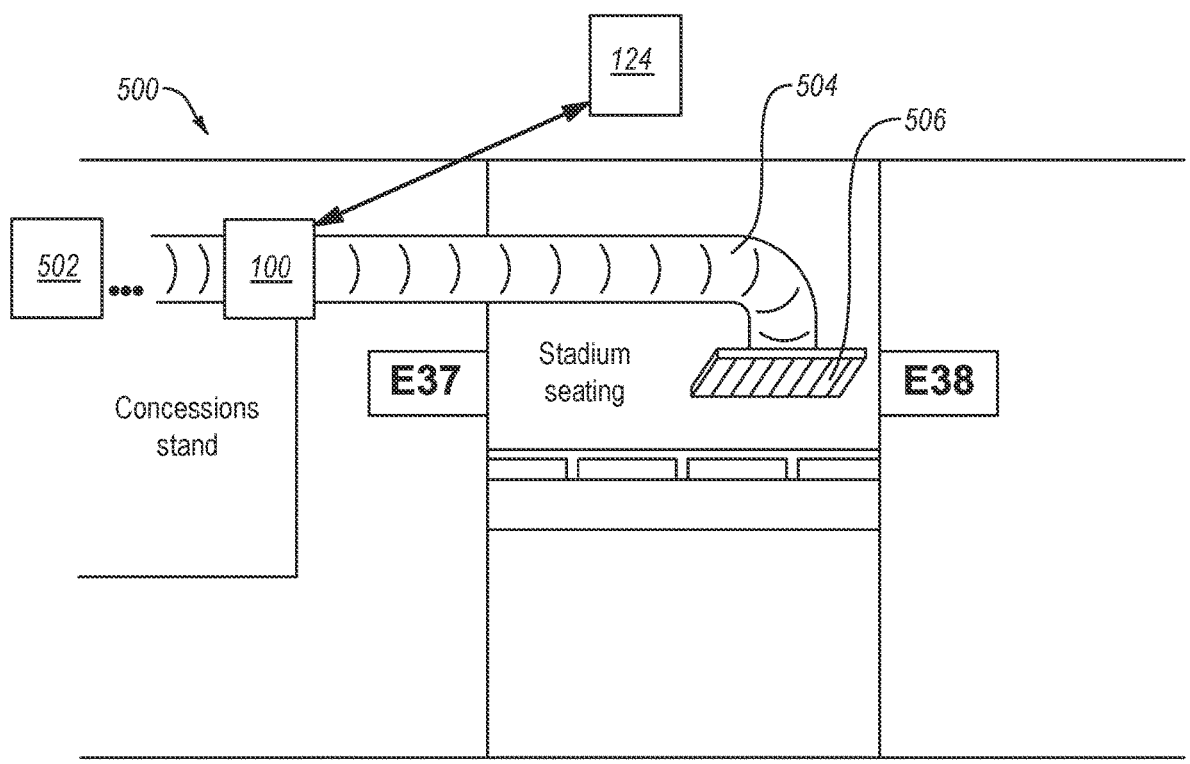
FIG. 5A is another embodiment of the device of FIG. 1A or 1B in another environment, according to at least some embodiments.

FIG. 5A is another embodiment of the device shown in FIG. 1A or 1B in another environment 500 (e.g., a stadium), according to at least some embodiments. In examples, the device 100 can also operate in conjunction with an HVAC system 502 or air handling system within a structure (e.g., environment 500). The environment 500 shown in FIG. 5A is a stadium having plurality of interconnected volumes (hallways, seating areas, a playing field, concession stands, and the like). The device 100 shown in FIG. 5A can operate in conjunction with the HVAC system 502 of the environment 500. The device 100 can be operably coupled to the HVAC system 502, for example, by positioning the device 100 in-line with a duct 504 or flow-path of the HVAC system 502 such that output from the device 100 can be distributed throughout the environment 500.

The device 100 can include all of the components previously described with regard to the device 100 of FIG. 1A or 1B. For example, the device 100 can include a dehumidifier, a scent control material source, a humidifier, and one or more fans. As disclosed herein, the scent control material source can output a scent control material (e.g., ozone) to sterilize (e.g., kill pathogens), remove odors, or otherwise treat the environment 500. The dehumidifier and humidifier can vary a relative to humidity of the environment 500. Additionally or alternatively, the humidifier can interact with residual scent control material within the environment and thereby prevent damage to objects within the environment 500 and reduce odors caused by residual scent control material. In some embodiments, the device 100 may be sized and shaped for use in harmony with existing humidifiers and/or dehumidifiers of the HVAC system 502.

At least one duct 504 is operably coupled to the HVAC system 502 within the environment 500. In examples, the HVAC system 502 can include a plurality of ducts 504 that define a network of ducts extending throughout the environment 500. Each duct 504 distributes air throughout the environment 500. For example, the HVAC system 502 can include a blower motor (now shown) which forces air through the duct 504 and out one or more vents 506. In examples, the device 100 can be positioned in-line with the duct 504 as to output along the duct 504 and through the vent 506. One or more of the acts described in methods 300 and 700 can be implemented by a device 100 that operates within the duct 504.

In some embodiments, multiple devices 100 can be positioned within respective ducts 504 of the HVAC system 502. The multiple devices 100, each in respective ducts 504, can be operated in unison or in series to treat the environment 500. Additionally or alternatively, multiple devices 100 can be positioned along a single duct 504 such that the output of each device 100 accumulates within the duct 504 before exiting through one or more vents 506. Additionally or alternatively, the device 100 can be incorporated into another component of the HVAC system 502. For example, one or more of the devices 100 can be positioned within an air handling unit of the HVAC system 502 and utilize the blower motor and network of ducts of the HVAC system 502 to distribute an output of the one or more devices 100.

As described herein, the output or operational parameters of the device 100 can be dictated by programing instructions received from one or more sources. In examples, the operational parameters of the device 100 can be input from a user interface on the device 100, a remote control 124, or a controller of the HVAC system. The user interface can be any one of the user interfaces disclosed herein (e.g., user interface 114). As described herein, the remote control 124 can be communicatively coupled to the one or more devices 100 through a wired or wireless connection.

Any combination of the acts of methods 300 or 700 (described below) can be utilized to sanitize and remove unpleasant odors from the environment 500 and objects within the environment 500. For example, a stadium, convention center, or concert venue (e.g., the environment 500) can be treated to remove unpleasant scents or kill pathogens after hosting a large quantity of occupants, such as a sporting event, convention, or concert. In examples, the unpleasant scents include body odors (e.g., thiol-containing excretions, carboxylic acid-containing excretions, sulfanylhexanol-containing excretions), breath odors (thiol-containing materials, sulfide-containing materials, etc.), perfumes, deodorants, colognes, equipment odors (e.g., dirt, manure, exhaust, etc.), or derivatives (e.g., reaction or degradation products) of any of the foregoing.

While treating the environment 500, one or more components of the HVAC system 502 can be temporarily suspended to prevent undesirable humidity, air pressure, air flow, or temperature fluctuations within the environment 500. As described herein, a greater relative humidity can render an oxidant less effective in treating the environment or objects within the environment. As such, the air conditioning function of the HVAC system can be temporarily disabled to provide a more conducive environment for oxidizing scent molecules and pathogens within the environment 500, with oxidants.

While the scent control material source is described as producing oxidants (e.g., ozone) and the scent molecules and pathogens as being oxidized, the scent control material source may produce any scent control material (e.g., reducer, absorbent, etc.) and the scent molecules and pathogens may be reacted (e.g., reduced), absorbed, or otherwise rendered safe and/or undetectable by a future patron of the environment 500.

While the device can be used while the environment is vacated or devoid of occupants, the device 100 can also treat the environment 500 when patrons occupy the environment 500. By providing an amount of oxidant responsive to local conditions and in the cyclical or periodic manner disclosed herein, the device 100 and methods herein can provide and maintain the concentration of the scent control material (e.g., oxidant) in the environment 500 at a safe level while still providing effective treatment. In examples, the scent control material source can output scent control material until a concentration of scent control material is reached that will sufficiently dissipate below a safe exposure level before occupants enter the environment. For example, a stadium can be treated with a relatively high concentration of scent control material in a selected duration, however, the output may be discontinued to allow the concentration to dissipate to a safe exposure level over a period of time before occupants of the stadium arrive.

Safe exposure levels may be set in the operational program based on health guidelines (e.g., governmental recommendations). For example, safe ozone exposure levels may include up to 0.2 ppm for no more than 2 hours exposure, up to 0.1 ppm for 8 hours per day exposure with light exertion, up to 0.08 ppm for 8 hours per day exposure with moderate exertion, or 0.05 ppm for 8 hours per day exposure with heavy exertion. Accordingly, the device 100 may safely control scents responsive to safe ozone exposure levels.

Any of the devices 100 may include application software stored in the controller or the remote control. One or more of the remote control, the controller, or the like may be used to selectively customize and execute the output parameters (e.g., in an operational program) of the device 100.

The one or more operational programs that provide the output parameters for the device 100 include operational programs specifically tailored to treat objects, such as clothing, equipment, etc., at a selected scent control material level to eliminate scents. An example of a scent control material are oxidants. It is known that oxidants (e.g., ozone) may degrade some materials, such as fabrics. The one or more operational programs may provide (e.g., direct the output of oxidant) levels of oxidant suitable to eliminate the scents yet still low enough to eliminate or at least limit degradation of the objects in the environment 500 due to oxidation. For example, the operational programs for controlling or treating the scents of objects within the environment 500 may include operating the scent control material source of the device 100 for a short time (e.g., at least 1 minute, 2 minutes to 5 minutes, 5 minutes to 10 minutes, etc.) to ensure that the objects, such as clothes in the environment 500, do not degrade due to too much oxidation.

In such examples, the on-time (e.g., amount of time that the oxidant is output from the device 100) may be followed by an off-time circulation of water vapor and/or ambient air through the environment 500. The off-time circulation may be accomplished by (the controller) executing operational instructions to direct the scent control material source to terminate operation while the humidifier and one or more fans run or continue to run to circulate water vapor and/or ambient air through the environment 500. The off-time circulation may be at least 1 minute, such as 1 minute to 60 minutes, 1 minute to 30 minutes, 10 minutes to 30 minutes, or 30 minutes to 60 minutes). In some examples, the operational program corresponding to the conditional input of eliminating scents in the environment 500 may include multiple on-time and off-time cycles, in any combination of durations.

Figure 5B:
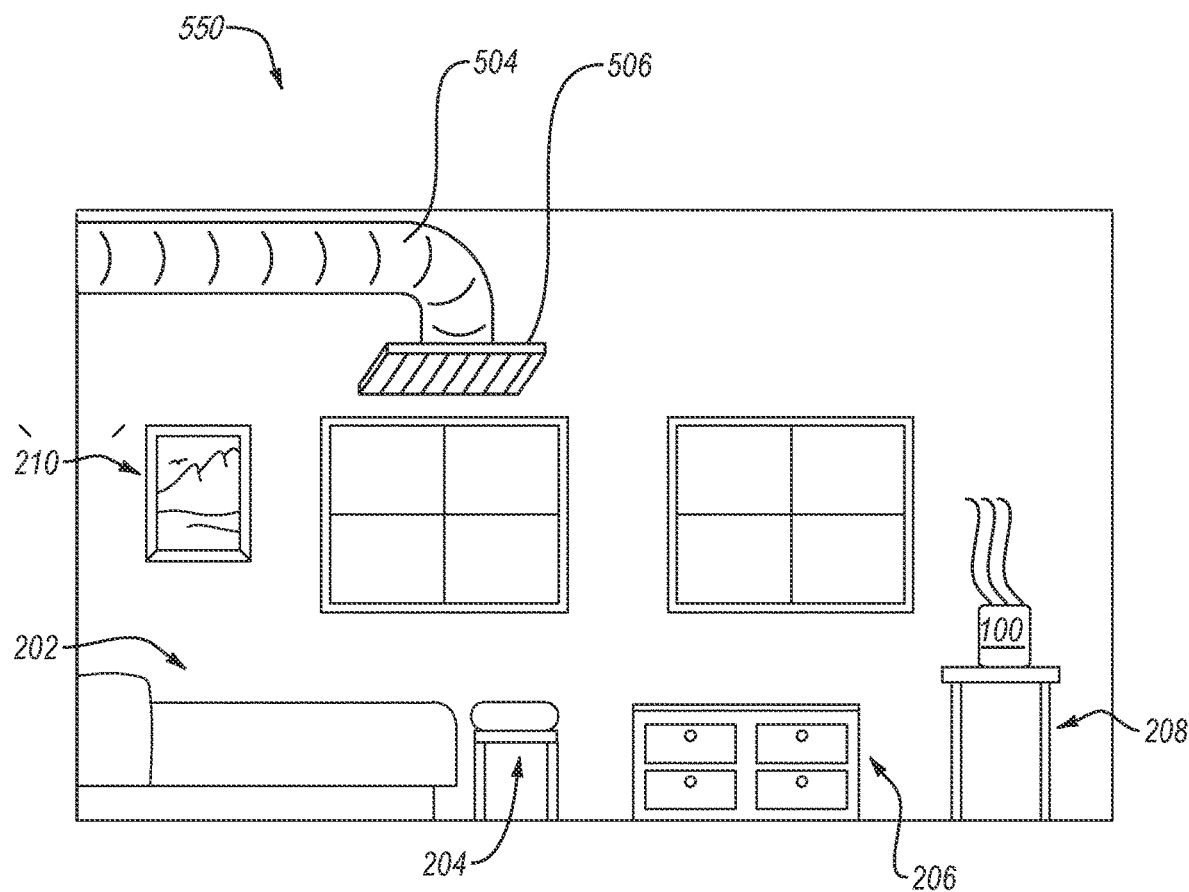
FIG. 5B is another embodiment of the device of FIG. 1A or 1B in another environment, according to at least some embodiments.

FIG. 5B is another embodiment of the device shown in FIGS. 1A and 1B in another environment 550, according to at least some embodiments. The environment 550 may be similar or identical to the environment 200 in one or more aspects. For example, the environment 550 includes an indoor room, such as a hotel room, bedroom, kitchen, living room, hospital room, laboratory room, operating room, office, or the like. Some examples of applicable environments 550 may include motor vehicles, airplanes, trains, stadiums, classrooms, libraries, office spaces, residential living spaces, commercial buildings, and the like. The environment 550 includes the HVAC system 502 and the device 100. As noted above, the device 100 can operate in conjunction with or accommodate the variations in air pressure and air flow in the environment 550 caused by the HVAC system 502. The HVAC system 502 includes the duct 504 or flow-path such that one or more of output or cold air return may be accomplished in the environment 550 via the vent 506.

The environment 550 can include a plurality of objects (e.g., furniture, bedding, textiles, carpeting, equipment, toilet, sink, tub, etc.) that are treated with the environment 550. For example, the environment 200 can include a bed 202 (including a mattress, pillows, a comforter, and so on), an ottoman 204, a dresser 206, a desk or table 208, artwork or decorations such as a painting or picture 210, or the like. Each of these objects contain scent molecules or sources of scent molecules, biological material or pathogens such as viruses or bacteria, mold, and so on. Exposure to an oxidant can reduce or eliminate pathogens in the environment and unpleasant odors originating from objects within the environment 550. However, too long of exposure to oxidants, such as ozone may degrade or damage some materials as disclosed above with respect to FIG. 2. Further, variations in air flow, air pressure, and humidity introduced by the HVAC system 502 may alter oxidant concentration in the environment 550. For example, the air added into the environment 550 via the HVAC system 502 or moisture therein reacts with oxidant (e.g., ozone) in the room to use at least some of the oxidant and lower the concentration of oxidant therein.

Turning the HVAC system 502 off during or after application of the oxidant allows the oxidant to react with scent molecules, sources of scent molecules, biological material, or pathogens in the environment 550 without interference from air added via the HVAC system. Accordingly, a system for cleaning environments may temporarily cease air input from the HVAC system 502 while the device 100 is generating and applying oxidant in the environment 550. Such control of the HVAC system 550 may be according to a schedule or responsive to activation of the device 100. After the device 100 has applied the oxidant in the environment 550, the HVAC system 502 may be activated to input fresh air into the environment 550, such as to reduce or eliminate the oxidant in the environment contemporaneously with or before a person occupies the room. In such examples, the environment 550 may be treated and an oxidant such as ozone may be returned to a safe level in the environment before or shortly after a person occupies the room. Person's working in such environments may experience safe levels (per hour) of ozone exposure despite coming into contact with some ozone.

The scent control material such as oxidant(s) can be input into the environment 550 at a rate which accounts for input or pressure from the HVAC system 502. For example, air pressure in many rooms may be maintained at a positive air pressure. Such air pressure may be at least 0.02-in. WC of pressure or even higher air pressure such as at least 0.1, 0.1-600, 0.5-100, 100-200, 200-500, or 300-600 in. WC of air pressure. In such examples, the oxidant may be utilized or react with incoming air from the HVAC system 502 at a given rate based on the amount of air pressure. Accordingly, application of an amount of oxidant into the room may take into account the amount of pressure therein. Additionally, positive air pressure may be selectively utilized to cause the concentration of oxidant to be reduced to safe levels or eliminated after a selected time under the positive air pressure (with no addition of more oxidant). For example, after oxidant is input into the environment 550, the HVAC system 502 may produce a positive air pressure in the environment 550 to reduce the amount of unreacted oxidant to a safe level before or contemporaneous with occupation of the environment 550.

The scent control material such as oxidant(s) can be input into the environment 550 at a rate which accounts for input or pressure from the HVAC system. For example, air pressure in many rooms such as hotel rooms or hospital rooms is often maintained at a negative air pressure. Such air pressure may be at least 0.02-in. WC of negative pressure or even higher negative air pressure such as at least 0.1, 0.1-600, 0.5-100, 100-200, 200-500, or 300-600 in. WC of negative air pressure. In such examples, the oxidant may be removed from the room via the HVAC system 502 at a given rate based on the amount negative pressure. Accordingly, application of oxidant into the room may take into account the amount of negative pressure therein.

A combination of the above air pressure conditions may be utilized, such as maintaining operation of a cold air return but turning the air conditioning off during application of oxidant. The cold air return may be positioned remote from the device 100 to ensure the oxidant is moved throughout the environment 550 as it travels from the device 100 to the cold air return. After the environment is treated, the environment 550 may be placed in or maintained at a positive air pressure by activating the air conditioning. Accordingly, the environment is treated and filled with fresh air to deactivate any residual oxidant and return the room to a safe oxidant concentration.

In some examples, the device 100 may operate with only the one or more fans therein after the oxidant is generated and output therefrom, such as for a duration to allow the oxidant concentration to reduce. By circulating air through in the environment 550 with the one or more fans of the device 100, the concentration of oxidant may be reduced by mixing of the air with the oxidant. Such local air flow control may prevent additional air and/or contaminants from prolonging treatment times (e.g., providing more air and contaminants to treat) from air introduced via the HVAC system 502. Such application of oxidant followed by off-time air flow through the one or more fans (without oxidant generation) may be repeated any number of times for any durations disclosed herein to carry out cyclic treatment of the environment 550. Similar techniques may be utilized where the one or more fans are not used after generation and/or application of oxidant in the environment 550. In such examples, the one or more fans of the device 100 may be deactivated for a duration after application of the oxidant. The application of oxidant and deactivation of the fans can be repeated any number of times for any of the on-time and/or off-time durations disclosed herein to provide cyclical treatment of the environment 550.

In the above examples, the air pressure or air flow associated therewith may be provided from the HVAC system 502 after each cyclical application of oxidant (FIG. 4) or after all of the applications of oxidant. Humidifying or dehumidifying may also be used in conjunction with controlling the air pressure or air flow in some examples. For example, after the oxidant is applied in the environment 550, the device 100 may apply humidity to the environment 550 to a selected humidity level or for a selected duration. Such application of humidity can quickly lower the amount of oxidant in the environment 550. Such humidifying and dehumidifying can be carried out as described herein.

The device 100 used in conjunction with the HVAC system 502 allows users to treat an environment to remove odors and eliminate pathogens without damaging items in the environment and without causing exposure to persons in the environment over acceptable safe limits. As described above, the device 100 includes the dehumidifier 102, the scent control material source 104 (e.g., oxidant generator), the humidifier 106, the controller 108, the at least one fan 110, the power supply 112, the user interface 114, the data connection 118, the housing 120, and the remote control 116. In some examples, one or more of the above-noted components may be omitted from the device 100. For example, the device may not include one or more of the remote control 116, humidifier 106, dehumidifier 102, or data connection 118. The controller 108 is operably coupled to the scent control material source 104 (e.g., oxidant generator) and the controller 108 includes one or more operational programs stored therein to control output of an oxidant (e.g., ozone) from the device 100.

As described herein, the output or operational parameters of the device 100 and even the HVAC system 502 can be controlled by programing instructions received from one or more sources. In examples, the operational parameters of the device 100 can be input from a user interface on the device 100, a remote control 124, the controller 108 of the device 100, or a controller of the HVAC system 502.

Any of the techniques and acts disclosed above can be utilized in the methods 300 and 700 (below) to sanitize and remove unpleasant odors from the environment 550 and objects within the environment 550. For example, controlling the flow of air from the HVAC system 502 as disclosed above may be implemented in the method 300 alternatively or in addition to dehumidifying and/or humidifying the environment. Any combination of the acts of methods 300 or 700 (described below) can be utilized to sanitize and remove unpleasant odors from the environment 550 and objects within the environment 550. For example, a hotel room, a hospital room, an office, a bedroom, a kitchen, a dining room, a laboratory, or other rooms can be treated to remove unpleasant scents or kill pathogens after hosting occupants. In examples, the unpleasant scents include body odors, breath odors, perfumes, deodorants, colognes, smoke (e.g., fire, cigarettes, cigars, marijuana, or the like), or derivatives of any of the foregoing.

Figure 6:
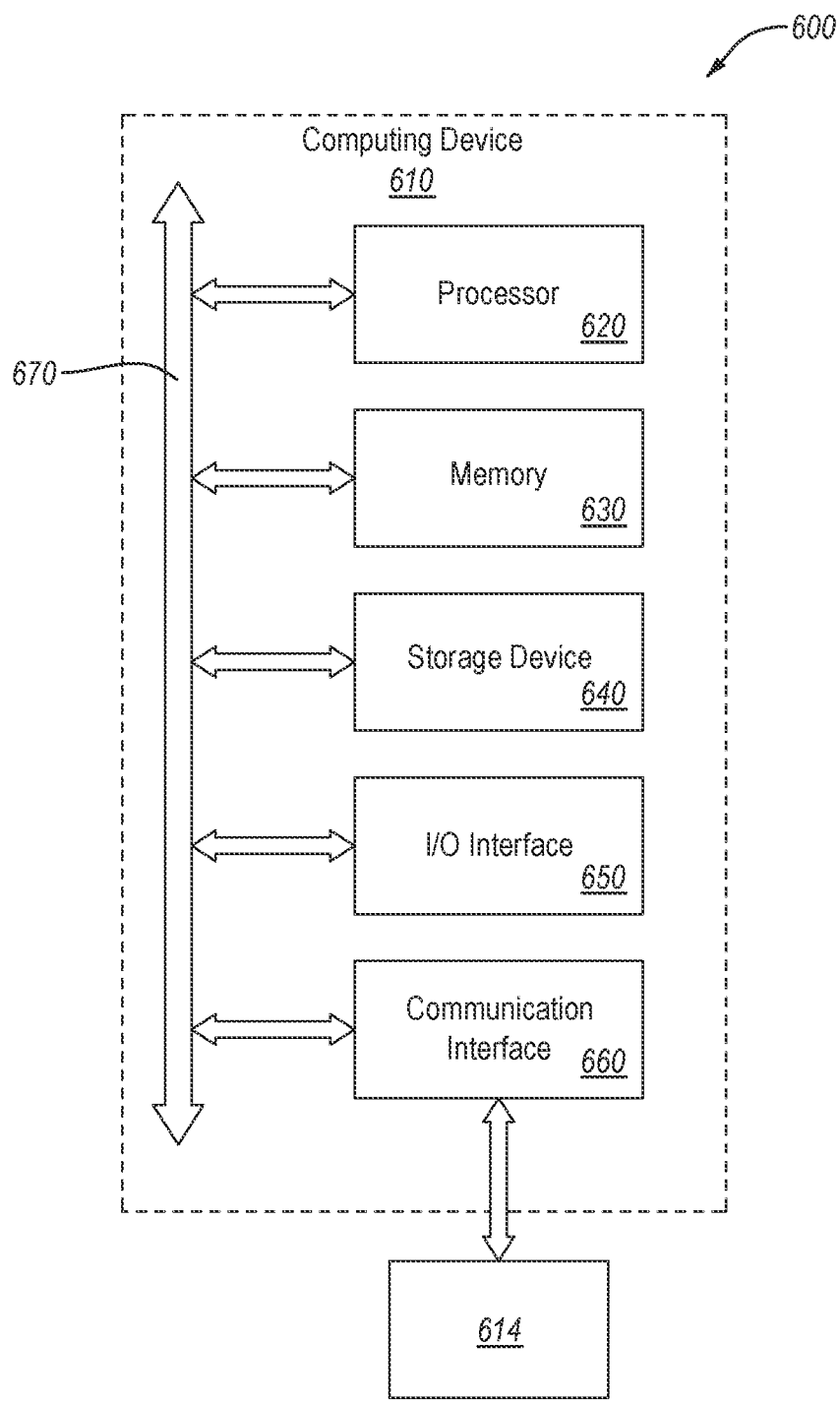
FIG. 6 is a block diagram of a controller, according to at least some embodiments.
Figure 7:
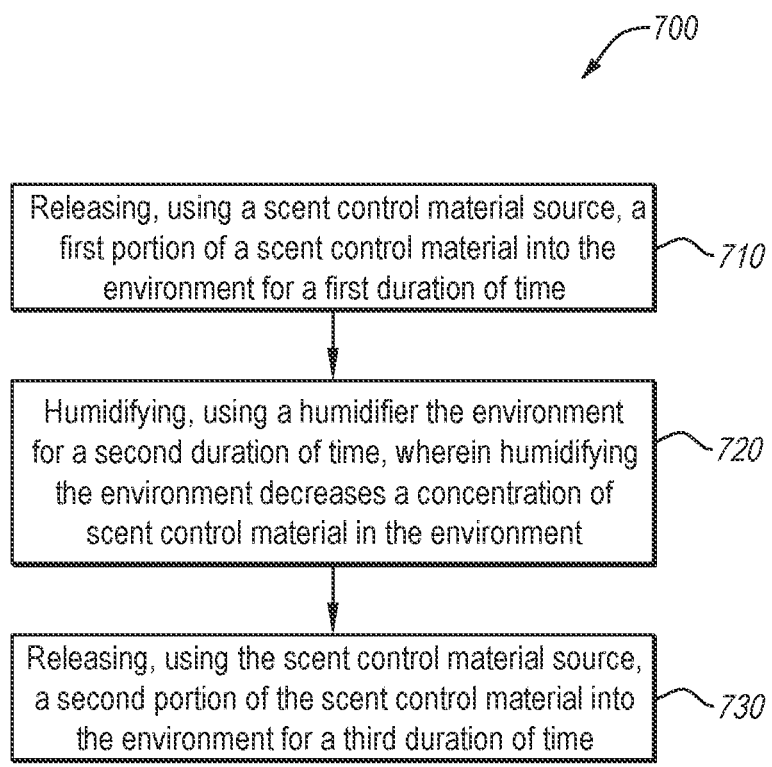
FIG. 7 is a flow diagram of a method of treating an environment, according to at least some embodiments.

Any of the example controllers, computing devices, remote controls, remote input devices, or systems disclosed herein may be used to carry out any of the example methods disclosed herein. FIG. 6 is a block diagram of a controller 600 for executing any of the example methods disclosed herein, according to an embodiment. The controller 600 may implement any of the example methods disclosed herein, such as method 300 (FIG. 3) and method 700 (FIG. 7). The controller 600 includes at least one computing device 610. The at least one computing device 610 is an exemplary computing device that may perform one or more of the acts described above, such as methods 300 or 700. The at least one computing device 610 may include one or more servers, one or more computers (e.g., desk-top computer, lap-top computer), one or more mobile computing devices (e.g., smartphone, tablet, etc.), or one or more custom computing systems assembled to execute proprietary functions. The computing device 610 may comprise at least one processor 620, memory 630, a storage device 640, an input/output ("I/O") device/interface 650, and a communication interface 660. In examples, the computing device 610 may be sized to fit in another device, such as the housing of the device 100.

While an example computing device 610 is shown in FIG. 6, the components illustrated in FIG. 6 are not intended to be limiting of the controller 600 or computing device 610. Additional or alternative components may be used in some examples. Further, in some examples, the controller 600 or the computing device 610 may include fewer components than those shown in FIG. 6. For example, the controller 600 may not include the one or more additional computing devices 612 (e.g., remote computing device). Rather, the one or more additional computing devices 612 may be separate and distinct from the computing device 610 of the controller 600. In some examples, the at least one computing device 610 may include connections to a plurality of computing devices, such as a server farm, computational network, or cluster of computing devices. Components of computing device 610 shown in FIG. 6 are described in additional detail below. In examples, the controller 600 or computing device 610 may be implemented as the controller 108 (FIG. 1A).

In some examples, the processor(s) 620 includes hardware for executing operational programs or instructions (e.g., instructions for carrying out one or more portions of any of the methods disclosed herein), such as those making up a computer program. For example, to execute operational programs or instructions, the processor(s) 620 may retrieve (or fetch) the operational instructions from an internal register, an internal cache, the memory 630, or a storage device 640 and decode and execute them. In particular examples, processor(s) 620 may include one or more internal caches for data such as oxidant output parameters or voltage amounts correlated to oxidant (or other scent control material) output parameters. As an example, the processor(s) 620 may include one or more instruction caches, one or more data caches, and one or more translation lookaside buffers (TLBs). Operational instructions in the instruction caches may be copies of instructions in memory 630 or storage device 640. In some examples, the processor 620 may be configured (e.g., include programming stored thereon or executed thereby) to carry out one or more portions of any of the example methods disclosed herein.

In some examples, the processor 620 performs any of the acts disclosed herein such as in methods 300, 700 or cause one or more portions of the computing device 610 or controller 600 to perform at least one of the acts disclosed herein. Such a configuration may include one or more operational programs (e.g., computer program products) or application software that are executable by the at least one processor 620. For example, the processor 620 may automatically select an operational program responsive to receiving the one or more conditional inputs or automatically adjust one or more operational parameters of the device 100 to the one or more selected oxidant output parameters.

The at least one computing device 610 (e.g., a server, remote control, or remote input device) may include at least one memory storage medium (e.g., memory 630 and/or storage device 640). The computing device 610 may include memory 630, which is operably coupled to the processor(s) 620. The memory 630 may be used for storing data, metadata, application software, and operational programs for execution by the processor(s) 620. The memory 630 may include one or more of volatile and non-volatile memories, such as Random Access Memory (RAM), Read Only Memory (ROM), a solid state disk (SSD), Flash, Phase Change Memory (PCM), or other types of data storage. The memory 630 may be internal or distributed memory.

The computing device 610 may include the storage device 640 having storage for storing data or instructions (e.g., application software, conditional inputs, output parameters, and operational programs). The storage device 640 may be operably coupled to the at least one processor 620. In some examples, the storage device 640 may comprise a non-transitory memory storage medium, such as any of those described above. The storage device 640 (e.g., non-transitory storage medium) may include a hard disk drive (HDD), a floppy disk drive, flash memory, an optical disc, a magneto-optical disc, magnetic tape, or a Universal Serial Bus (USB) drive or a combination of two or more of these. Storage device 640 may include removable or non-removable (or fixed) media. Storage device 640 may be internal or external to the computing device 610. In some examples, storage device 640 may include non-volatile, solid-state memory. In some examples, storage device 640 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these. In some examples, one or more portions of the memory 630 and/or storage device 640 (e.g., memory storage medium(s)) may store one or more databases thereon. At least some of the databases may be used to store one or more of ambient characteristics, conditional inputs, correlations between conditional inputs and output parameters of the device 100, or any other data as disclosed herein.

In some examples, one or more of application software, operational programs (e.g., programs determining and initiating output from the scent control material source, dehumidifier, humidifier, fan, or a combination thereof), local conditions, conditional inputs, correlations between conditional inputs and output parameters, or any other data, may be stored in a memory storage medium such as one or more of the at least one processor 620 (e.g., internal cache of the processor), memory 630, or the storage device 640. In some examples, the at least one processor 620 may access (e.g., via bus 670) the memory storage medium(s) such as one or more of the memory 630 or the storage device 640. For example, the at least one processor 620 may receive and store the data (e.g., look-up tables) as a plurality of data points in the memory storage medium(s). The at least one processor 620 may execute programming stored therein adapted access the data in the memory storage medium(s) to perform any of the acts disclosed herein.

The computing device 610 also includes one or more I/O devices/interfaces 650, which are provided to allow a user to provide input to, receive output from, and otherwise transfer data to and from the computing device 610. These I/O devices/interfaces 650 may include a mouse, keypad or a keyboard, a touch screen, camera, optical scanner, network interface, web-based access, modem, a port, other known I/O devices, any of the one or more selectors disclosed herein, or a combination of such I/O devices/interfaces 650. The one or more selectors may be manipulated by a stylus or a finger. The touch screen may be activated with a stylus or a finger.

The I/O devices/interfaces 650 may include one or more devices for presenting output to a user, including, but not limited to, a graphics engine, a display (e.g., a display screen or monitor), one or more output drivers (e.g., display drivers), a user interface, one or more audio speakers, and one or more audio drivers. In certain examples, I/O devices/interfaces 650 provide graphical data to a display for presentation to a user. The graphical data may be representative of one or more graphical user interfaces and/or any other graphical content as may serve a particular implementation.

The computing device 610 may further include a communication interface 660 (e.g., data connection 118 of FIG. 1A). The communication interface 660 may include hardware, software, or both. The communication interface 660 may provide one or more interfaces for communication (such as, for example, packet-based communication) between the computing device 610, a remote control, a remote input device, and one or more additional (e.g., remote) computing devices 612 or one or more networks. For example, communication interface 660 may include a network interface controller (NIC) or network adapter for communicating with an Ethernet or other wire-based network or a wireless NIC (WNIC) or wireless adapter for communicating with a wireless network, such as a WI-FI.

Any suitable network and any suitable communication interface 660 may be used. For example, computing device 610 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, one or more portions of controller 600 or computing device 610 may communicate with a wireless PAN (WPAN) (such as, for example, a BLUETOOTH WPAN), a WI-FI network, a WI-MAX network, a cellular telephone network (such as, for example, a GSM network), or other suitable wireless network or a combination thereof. Computing device 610 may include any suitable communication interface 660 for any of these networks, where appropriate.

The computing device 610 may include the bus 670. The bus 670 may include hardware, software, or both that couples components of computing device 610 to each other. For example, bus 670 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

It should be appreciated that any of the examples of acts described herein, such as in the methods 300 or 700, may be performed by and/or at the controller 600 or computing device 610 thereof. As noted the computing device 610 may be sized, shaped, and otherwise fit one or within the devices or systems (e.g., remote control, remote input device, etc.) disclosed herein. The operational programs may be stored and/or executed by the one or more of the controller 600 or the computing device 610 therein, the remote control, or the remote input device.

FIG. 7 is a flow diagram of a method 700 of treating an environment, according to at least some embodiments. The method 700 includes the act 710 of, with a scent control material source, releasing a first portion of a scent control material into the environment for a first duration of time. The method 700 includes the act 720 of, with a humidifier, humidifying the environment for a second duration of time, wherein humidifying the environment decreases a concentration of the scent control material in the environment.

In examples, any of the components (e.g., the dehumidifier, scent control output source, or humidifier) referenced in method 300 can be placed within the environment. The components can be positioned and coupled to a singular housing (e.g., housing 120 of device 100). In some examples, the components can be distinct (i.e., not positioned within a singular housing) but individually positioned within the environment and communicatively coupled to one another. The environment can include permanent or temporary structures, vehicles, residences, industrial spaces, offices, entertainment venues, agricultural structures, modes of public transportation, or any other setting capable of being treated.

The method 700 can optionally include the act of, with a dehumidifier, dehumidifying an environment to a predetermined relative humidity. The dehumidifier can include any of the dehumidifiers disclosed herein. For example, the dehumidifier can be dehumidifier 102 positioned within the device 100. The predetermined relative humidity can be a percentage decrease in a relative humidity of the environment before act 710. Additionally, or alternatively, the predetermined relative humidity level can be a desired threshold, wherein the predetermined relative humidity is reached when a relative humidity of the environment drops below or reaches the desired threshold. For example, the desired threshold can be a relative humidity within the environment of 70%.

The method 700 includes the act 710 of with a scent control material source, releasing a scent control material into the environment for a first duration of time. The scent control material source can include any of the scent control material sources disclosed herein. For example, the scent control material source can be scent control material source 104 positioned within the device 100. In examples, the scent control material source can output scent control material into the environment until a desired concentration of scent control material is in the environment. For example, the scent control material source can output a scent control material (e.g., ozone) into the environment until a concentration of scent control material is at or between 0.3 parts per million and 0.5 parts per million.

As disclosed herein, the quantity of scent control material released or output into the environment can be relatively large in order to inundate or rapidly saturate the environment with scent control material. As such, the first duration of time can vary in length relative to the amount or quantity of scent control material being released into the environment, the size of the environment, the objects positioned within the environment, the state of the environment (e.g., stench, cleanliness, etc.), or a combination thereof. For example, the first duration of time can be relatively short when a large quantity of scent control material is being output or released into a small and relatively clean environment.

In some examples, releasing a scent control material includes controlling output parameters of the scent control material source by executing an operational program to output the scent control material at selected output parameters.

Releasing scent control material from the scent control material source at the selected output parameters may include outputting one or more of ozone, diatomic oxygen, diatomic halogens, peroxides, radicals of any of the foregoing, metastable oxygen, negatively charged metal oxides, encapsulated ozone, activated ozone, peracetic acid, chlorine dioxide, thixotropic gels, singlet oxygen, hypochlorite, chlorite, cyclodextrins, hydroxide ions, nitrite ions, superoxide ions, or hydrogen ions. Releasing the scent control material at the selected output parameters may include outputting the scent control material from one or more of a coronal discharge generator or a negative ion generator. For example, outputting the scent control material may include outputting ozone from an ozone generator. Outputting the scent control material may include outputting negative ions (e.g., hydroxide ions) from a negative ion generator.

The method 700 includes the act 720 of, with a humidifier, humidifying the environment for a second duration of time, wherein humidifying the environment decreases a concentration of the scent control material in the environment. The humidifier can include any of the humidifiers disclosed herein. For example, the humidifier can be humidifier 106 positioned within the device 100. The scent control material source of act 710 can continue to output scent control material during the second duration of time. For example, as described in relation to FIG. 4, the scent control material source can decrease output, but continue to output scent control material into the environment, to control or regulate a concentration of scent control material within the environment. The second duration of time can be longer or shorter than the first duration of time or be equivalent to the first duration of time.

The method 700 can optionally include the act 730 of, with the scent control material source, releasing a second portion of scent control material into the environment for a third duration of time. The amount of scent control material output by the scent control material source during the third duration of time can be less than, greater than, or equal to the output of scent control material during the first duration of time.

The method 700 may include communicating one or more of the conditional inputs, output parameters, the operational program, or an operational program identifier to a controller via a remote control or remote input device. In such examples, the controller may select an operational program based on the conditional inputs or output parameters. The controller may execute the operational program such as by running the operational program communicated thereto or identified.

As described herein, one or more of the acts 710 and 720 can utilize one or more fans to circulate or promote airflow within the environment. For example, one or more fans can be positioned within the environment to circulate the scent control material within the environment.

In some examples, one or more of the acts 710 and 720, 730 may be initiated and regulated by the controller, such as selecting output parameters corresponding to the ambient characteristics of the environment, making or selecting an operational program having the selected output parameters, or controlling current output parameters of the components (e.g., dehumidifier, scent control material source, humidifier, fan(s)) by executing the operational program.

In some examples, the method 700 may include any of the acts of the method 300, or portions thereof. For example, the method 700 may include diffusing or distributing a chemical or compound from a diffusing component of the humidifier. Any of the acts disclosed herein for any of the methods disclosed herein may be performed by a remote control or remote input device, such as via application software stored thereon. The application software may include any of the application software disclosed herein.

FIGS. 8A-8D show a system 800 for treating an environment 802 according to some embodiments. The system 800 can include a plurality of scent control material sources 804A-804I. Each of the scent control material sources 804A-804I can be substantially similar to, and can include some or all of, the features of the scent control material source 104. For example, one or more of the plurality of scent control material sources 804A-804I can provide one or more oxidants, reducers, cyclodextrins, or other materials known to eliminate pathogens and/or control scent in gaseous form, vapor form, droplet form, liquid form, or even solid form. While FIGS. 8A-8D show the plurality as nine scent control material sources, the system 800 can include any number of scent control material sources, such as, more than about two, between about two and about ten, between about ten and about twenty, or more than about twenty.

Figure 8A:
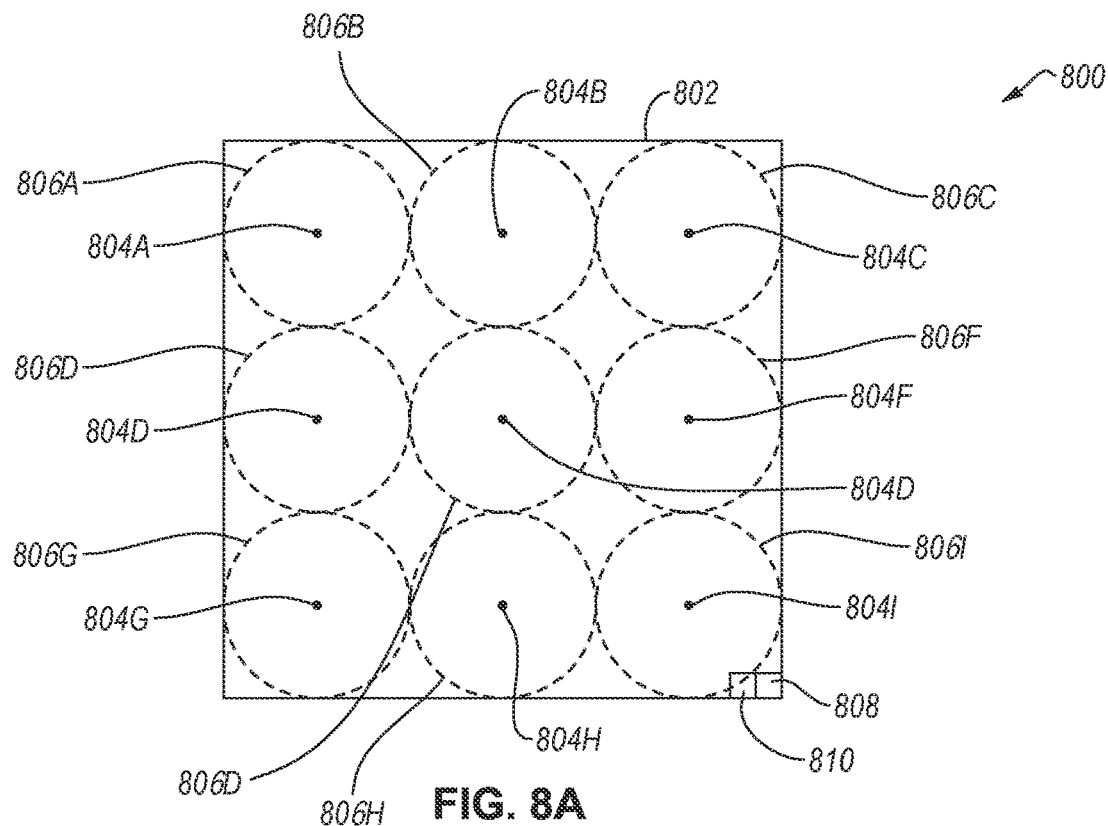
FIG. 8A shows an example of a system for treating an environment, according to at least some embodiments.

FIG. 8A shows the plurality of scent control material sources 804A-804I equidistantly disposed about the environment 802. Each of the scent control material sources 804A-804I can output a quantity of scent control material (e.g., ozone). For example, each of the scent control material sources 804A-804I can output ozone about a respective emission radius 806A-806I. As such, the concentration of scent control material (e.g., ozone) near the scent control material source (e.g., scent control material source 804A) can be relatively higher than a concentration of scent control material near the emission radius (e.g., emission radius 806A). A distance of the emission radius (i.e., distance from the scent control material source) can be based on or otherwise correlated to the output of the scent control material source and/or a duration of time the sent control material source operates. For example, a relatively higher output of scent control material can produce a relatively larger emission radius while a relatively lower output of scent control material can produce a relatively smaller emission radius. Similarly, operating the scent control material source for a relatively longer duration of time can produce a relatively larger emission radius while operating the scent control material source for a relatively shorter duration of time can produce a relatively smaller emission radius. For example, each emission radius 806A-806I can be at least about 2 meters, between about 2 meters and about 5 meters, between about 5 meters and about 10 meters, or more than about 10 meters. In some embodiments, a summation of the emission radii can be equivalent or substantially equivalent to size of the environment to be treated. While each respective emission radius 806A-806I is illustrated as having a similar size, the size or distance of one or more of the emission radii can be different from the size or distance of other emission radii in some embodiments.

Figure 8B:
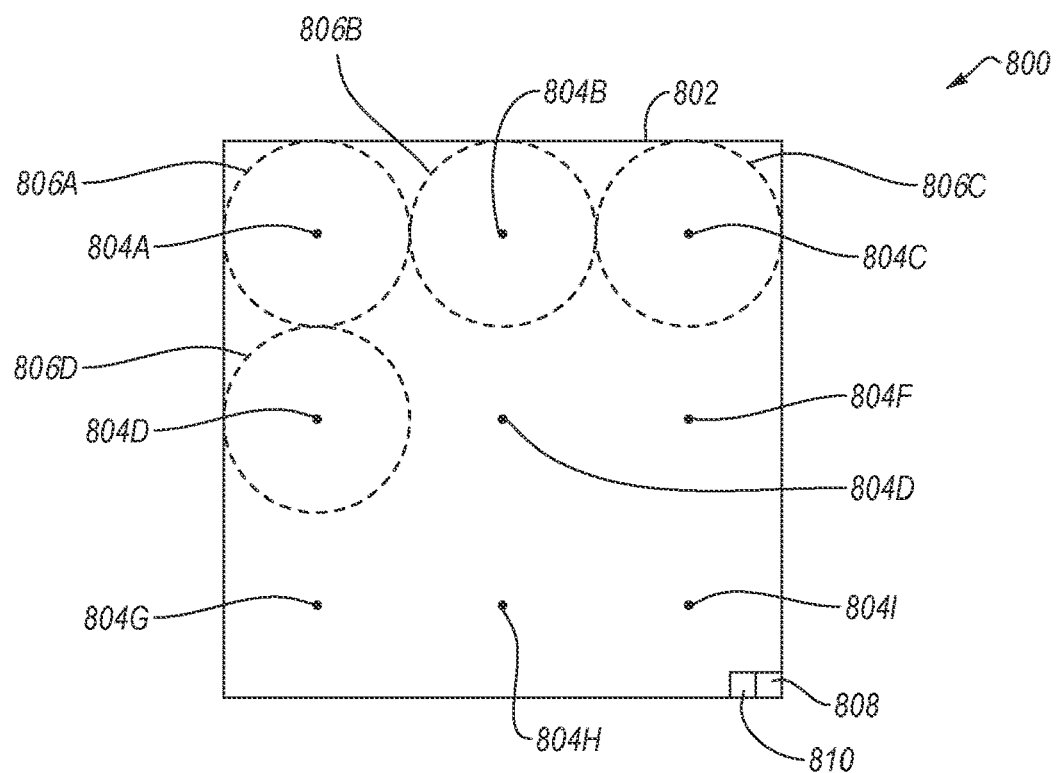
FIG. 8B shows an example of a system for treating an environment, according to at least some embodiments.
Figure 8C:
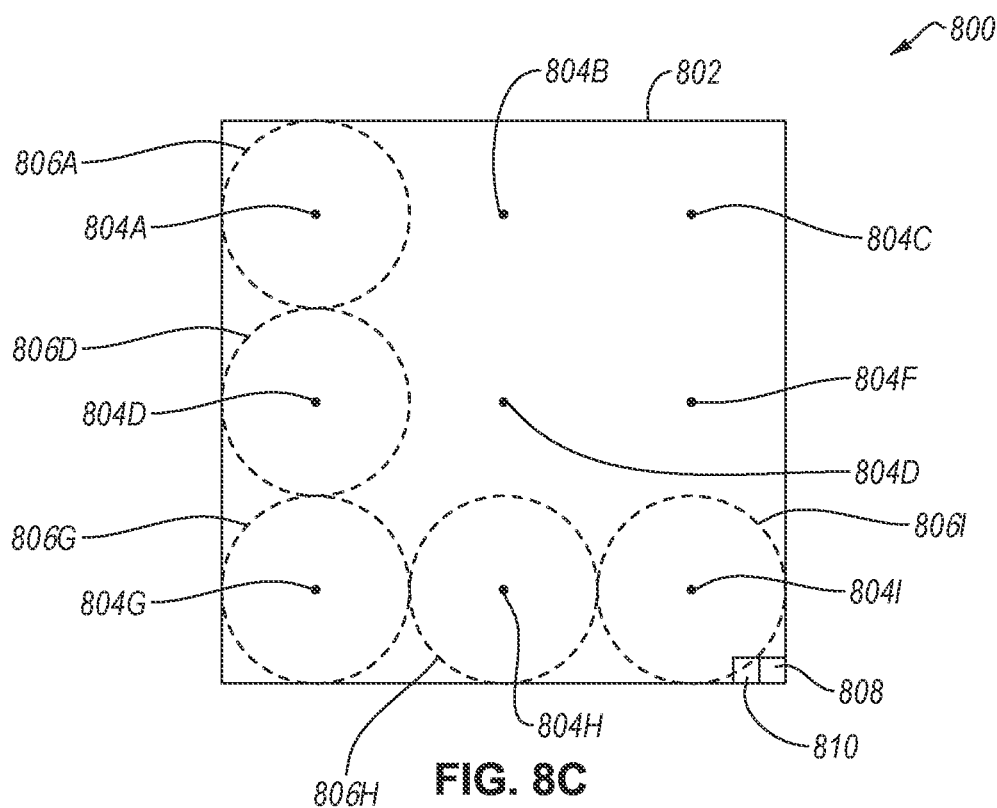
FIG. 8C shows an example of a system for treating an environment, according to at least some embodiments.
Figure 8D:
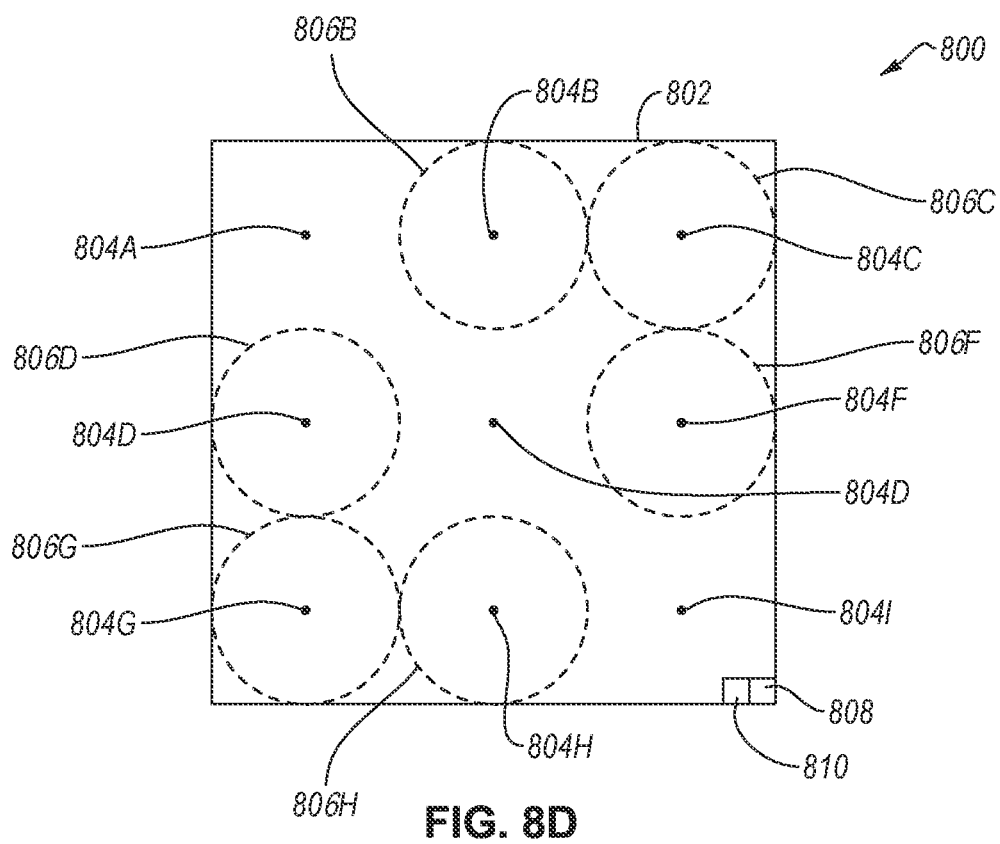
FIG. 8D shows an example of a system for treating an environment, according to at least some embodiments.

In embodiments, the system 800 can be utilized to deodorize, purify, and/or sanitize the environment 802. For example, while scent control material and scent control material sources are disclosed herein, the scent control material generated and output from the scent control material source may be utilized to treat (e.g., at least partially eliminate) pathogens such as bacteria, viruses, fungi, and the like in the environment 802. The environment 802 can be one or more hotel rooms, restaurants, rental vehicles, public transportation vehicles, stadiums, hospitals, cruise ships, convention centers, other environments, or combinations thereof. The environment 802 can be occupied or unoccupied during treatment. For example, one or more of the plurality of scent control material sources 804A-804I can output scent control material at a low enough concentration such that the wellbeing of occupants within the environment 802 are not affected, such as, below an Environmental Protection Agency threshold for ozone exposure. Alternatively, or additionally, only a select few or subset of the scent control material sources 804A-804I can be operated at a given time to treat portions of the room which are unoccupied or minimally occupied. FIGS. 8B-8D show various subsets of the plurality of scent control material sources 804A-804I outputting scent control material within the environment 802.

FIG. 8B shows the plurality of scent control material sources 804A-804I equidistantly disposed about the environment 802, however, only a first subset of the scent control material sources 804A-804D are outputting scent control material (as indicated by only the first subset of scent control material sources 804A-804D having a correlating emission radius 806A-806D). Under some circumstances, it can be beneficial to only emit scent control material from the first subset of scent control material sources 804A-804D rather than outputting scent control material from the entirety of the scent control material sources 804A-804I. For example, the first subset of scent control material sources 804A-804D can output an oxidant when that region of the environment 802 is not occupied (e.g., a region of a convention center that is temporarily vacant of occupants). While the first subset of scent control material sources 804A-804D includes four scent control material sources, other subsets can be formed of more or fewer scent control material sources in other embodiments.

FIG. 8C shows the plurality of scent control material sources 804A-804I equidistantly disposed about the environment 802, however, only a second subset of the scent control material sources 804A, 804D, 804G, 804H are outputting scent control material (as indicated by only the first subset of scent control material sources 804A, 804D, 804G, 804H having a correlating emission radius 806A, 806D, 806G, 806H). While the second subset of scent control material sources 804A, 804D, 804G, 804H includes four scent control material sources, other subsets can be formed of more or fewer scent control material sources in other embodiments. In some embodiments, the first subset shown in FIG. 8B can output a first quantity or amount of scent control material for a first duration of time and thereafter the second subset shown in FIG. 8C can output a second quantity or amount of scent control material for a second duration of time. In some embodiments, the first subset and second subset can share one or more common scent material sources, for example, scent control material sources 804A, 804D are shared between the first and second subsets shown in FIGS. 8B and 8C. In other embodiments, other scent control material sources can be shared. In yet other embodiments, none of the scent control material sources 804A-804I are shared between subsets.

FIG. 8D shows the plurality of scent control material sources 804A-804I equidistantly disposed about the environment 802, however, a third subset of the scent control material sources 804B, 804C, 804F and a fourth subset of the scent control material sources 804C, 804G, 804H are each outputting scent control material (as indicated by correlating emission radius 806A, 806D, 806G, 806H of each of the third and fourth subsets). In some embodiments, the third subset of the scent control material sources 804B, 804C, 804F and a fourth subset of the scent control material sources 804C, 804G, 804H can output scent control material simultaneously. In other embodiments, the third subset of the scent control material sources 804B, 804C, 804F can operate for a duration of time prior to operation of the fourth subset of the scent control material sources 804C, 804G, 804H. The respective durations of time within which the third and fourth subsets output scent control material may or may not be equivalent.

According to some embodiments, the system 800 can include a controller 808. The controller 808 can be configured to generate or cause one or more of the plurality of scent control material sources 804A-804I to output an amount or quantity of scent control material for a duration of time. For example, the controller 808 can include one or more operational programs stored therein for controlling the duration of output time or the quantity of oxidant output from one or more of the scent control material sources 804A-804I. The one or more operational programs can include machine readable and executable instructions. The controller 808 can be in electrical communication with one or more of the plurality of scent control material sources 804A-804I. Accordingly, the controller 808 can selectively control the output of one or more of the plurality of scent control material sources 804A-804I responsive to an operational program of the stored operational programs. The output of one or more of the plurality of scent control material sources 804A-804I can be based on a predetermined schedule or manually activated when desired (e.g., after traditional cleaning techniques are complete and a hotel room will remain unoccupied for a duration of time). Some suitable wireless connections can include any of Wi-Fi, Bluetooth, infrared, or radio frequency connections between the controller 808 and one or more of the plurality of scent control material sources 804A-804I. A hardwired connection can carry one or more of power or data. Suitable hardwired connections can include one or more of circuits, transistors, capacitors, resistors, electrical wiring, or any other tangible connection capable of carrying electrical bias(es) between the controller and one or more of the plurality of scent control material sources 804A-804I.

The controller 808 can include one or more of a cellular phone, a laptop, a tablet, a proprietary controller configured to specifically communicate with one or more of the plurality of scent control material sources 804A-804I, a smart watch, a GPS device, or the like. For example, the controller 808 may be a cellular phone, tablet, watch, or other electronic device storing executable application software with operational program, mode selection, and output parameter customization options. In some embodiments, the controller 808 can operate any combination of the plurality of the scent control material sources 804A-804I (e.g., form one or more subsets of the plurality of scent control material sources 804A-804I). In some embodiments, the controller 808 can be disposed on one of the plurality of scent control material sources 804A-804I. In some embodiments, the controller 808 can be a stand-alone device disposed within the environment 802 or outside of the environment 802 (e.g., within a convention center but not within a main exhibition hall of the convention center).

In some embodiments, the system 800 can include one or more sensors 810. The one or more sensors 810 can be configured to measure a concentration of scent control material source within the environment 802. For example, the one or more sensors 810 can measure the concentration of scent control material within a location in the environment 802 and suspend output of one or more of the plurality of scent control material sources 804A-804I when the measured concentration of scent control material meets or exceeds a threshold. The threshold can be a concentration threshold correlating with a quantity of scent control material output into the environment 802 required to eliminate contaminants, such as, pathogens and/or unpleasant odor causing bacteria from the environment 802. For example, the threshold concentration can be between about 0.003 parts per million (ppm) and about 1.0 ppm, such as at least 0.01 ppm, 0.1 ppm, 0.3 ppm, 0.5 ppm, or 0.7 ppm.

Additionally, or alternatively, the threshold can be a concentration of scent control material within the environment 802 that is selected for safe for human occupation of the environment. For example, the threshold can be at or below a safety threshold to keep the environment 802 safe for occupation (e.g., an Environmental Protection Agency threshold for ozone exposure). In some embodiments, the one or more sensors 810 can be disposed on one or more of the plurality of scent control material sources 804A-804I. For example, in some embodiments, each of the plurality of scent control material sources 804A-804I can include a respective sensor 810. Alternatively, only one or a few of the plurality of scent control material sources 804A-804I can include a respective sensor 810. In some embodiments, the one or more sensors 810 can be a stand-alone device disposed within the environment 802 or outside of the environment 802 (e.g., within a cabin on a cruise ship).

In some embodiments, the plurality of scent control material sources 804A-804I can be arranged and operated in concert with an HVAC system or air handling system of the environment 802. For example, the plurality of scent control material sources 804A-804I can be arranged and operated to compensate for a negative pressure induced on the environment 802 by one or more air returns. Similarly, the plurality of scent control material sources 804A-804I can be arranged and operated to compensate for air flow within the environment 802 induced by one or more vents supplying conditioned air to the environment 802. In some embodiments, one or more of the plurality of scent control material sources 804A-804I can be disposed within or at the one or more vents suppling conditioned air to the environment 802, such that scent control material output by the plurality of scent control material sources 804A-804I can be dispersed via air flowing from the one or more vents. In some embodiments, after operation of the system 800 has ceased, the HVAC system can be operated for a sufficient duration of time to reduce or eliminate any residual concentration of scent control material from the environment 802. In some examples, the scent control material source may be positioned between an air input and an air return in an environment (e.g., indoor space).

Figure 9:
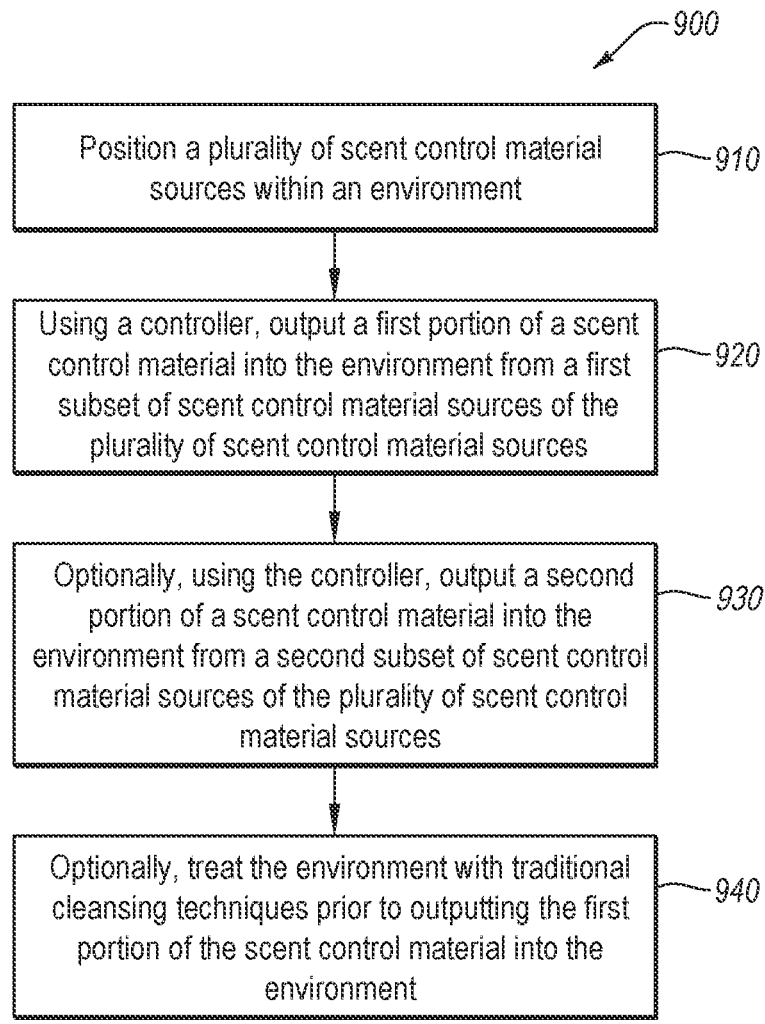
FIG. 9 is a flow diagram of a method of treating an environment, according to at least some embodiments.

FIG. 9 is a flow diagram of a method 900 of treating an environment, according to at least some embodiments. The method 900 includes the act 910 of positioning a plurality of scent control material sources within an environment. The method 900 includes the act 920 of, using a controller, output a first portion of a scent control material into the environment from a first subset of scent control material sources of the plurality of scent control material sources. The method 900 includes the act 930 of using the controller, output a second portion of a scent control material into the environment from a second subset of scent control material sources of the plurality of scent control material sources. The method 900 includes the act 940 of treating the environment with traditional cleansing techniques prior to releasing the first portion of the scent control material into the environment.

Accordingly, the method 900 may treat an environment to eliminate or mask scents or sources of scents within the environment. The method 900 may include more or fewer acts than the acts 910-940. For example, the method 900 may not include one or more of the acts 930 and/or 940. In other words, acts 930 and 940 are optional and therefore need not be implemented to treat an environment using the method 900. Instead, acts 930 and 940 are additional acts that provide additional functions for the method 900.

The method 900 includes the act 910 of positioning a plurality of scent control material sources within an environment. In some embodiments, the plurality of scent control material sources can include two or more scent control material sources. The plurality of scent control material sources can be arranged within the environment such that the environment, or a region within the environment, is substantially treated when the plurality of scent control material sources or a portion thereof are operating (i.e., outputting scent control material). Each of the plurality of scent control material sources can be temporarily or permanently affixed within the environment, such as, fastened our mounted to a wall or ceiling, or otherwise disposed on a floor of the environment. In some embodiments, the environment can be a cruise ship, a hospital, a concert venue, a stadium, a convention center, a hotel room, a bathroom, another environment, or a combination thereof.

The method 900 includes the act 920 of, using a controller, output a first portion of a scent control material into the environment from a first subset of scent control material sources of the plurality of scent control material sources. The method 900 includes the act 930 of using the controller, release a second portion of a scent control material into the environment from a second subset of scent control material sources of the plurality of scent control material sources. The first portion of scent control material and the second portion of scent control material can be one or more oxidants, reducers, cyclodextrins, or other materials known to eliminate pathogens and/or control scent in gaseous form, vapor form, or droplet form. The one or more oxidants may include one or more of ozone, diatomic oxygen, diatomic halogens, peroxides, radicals of any of the foregoing or components thereof, metastable oxygen, negatively charged metal oxides, encapsulated ozone, activated ozone, peracetic acid, chlorine dioxide, thixotropic gels, singlet oxygen, hypochlorite, or chlorite. Ozone and derivatives thereof (e.g., singlet oxygen, diatomic oxygen, atomic oxygen, metastable oxygen, or activated oxygen) may be particularly suitable for controlling scents (e.g., breaking down or reacting scent molecules or scent molecule sources) and eradicating pathogens within an environment.

The first portion of scent control material source can treat a region of the environment surrounding the first subset of scent control material sources. Similarly, the second portion of scent control material source can treat a different region of the environment surrounding the second subset of scent control material sources. In some embodiments, the treated regions can overlap. The portions of scent control material output by each of the first and second subsets can correlate to an output of each scent control material source and a duration of time each scent control material source is operated. For example, the first subset of scent control material sources can each output a first quantity of scent control material over a first duration of time while the second subset of scent control material sources can each output a second quantity of scent control material over a second duration of time. The first duration of time can be equivalent or different from the second duration of time.

In some embodiments, the first and second subsets can have an equivalent number of scent control material sources. In some embodiments, the first subset may have fewer or more scent control material sources than the second subset of scent control material sources. While only first and second subsets are described herein, the plurality of scent control material sources can form or otherwise define more than two subsets, such as, between two and ten subsets, or more than ten subsets. In some embodiments, a particular subset can be formed or defined from the plurality of scent control material sources based on a use or occupation of the environment. For example, the first subset can be defined as a set of the scent control material sources that are not positioned near any occupants of the environment during a particular portion of a day (e.g., in the morning) and the second subset can be defined as a set of the scent control material sources that are not positioned near any occupants of the environment during another particular portion of the day (e.g., in the evening). Alternatively, or additionally, the first and/or second subsets can be disposed near occupants but output relatively low quantities of scent control material to eliminate potential health risks associated with exposure to the scent control material source.

The method 900 includes the act 940 of treating the environment with traditional cleansing techniques prior to outputting the first portion of the scent control material into the environment. For example, a hotel room or other rooms can be cleaned using solvents, vacuums, brooms, wipes, and other traditional cleansing products and techniques. Yet, even after traditional cleansing techniques are applied, pathogens and unpleasant scents including body odors, breath odors, perfumes, deodorants, colognes, smoke (e.g., fire, cigarettes, cigars, marijuana, or the like) can persist. Outputting the first portion of the scent control material into the environment after a traditional cleansing can reduce or eliminate pathogens and undesirable scents that may persist in the environment.

While the example embodiments described with reference to FIGS. 8A-8D relate to multiple scent control material sources 804A-804I operating simultaneously and/or sequentially within a single environment 802, the system and methods can also or alternatively be implemented in multiple separate indoor environments. For example, one or more scent control material sources (e.g., scent control material sources 804A-804I) can each be positioned or otherwise disposed within a single environment of a set or subset of indoor environments (e.g., cabins in a cruise ship, hotel rooms, hospital rooms, etc.). In some embodiments, each of the multiple separate environments can be treated by one or more scent control material sources configured to operate while the environment is unoccupied. Additionally, or alternatively, each of the multiple separate environments can be treated by one or more scent control material sources while the environment is occupied by outputting an amount or concentration of scent control material that is safe for occupants within the environment.

In some embodiments, one or more of the scent control material sources can be communicatively coupled to a controller (e.g., controller 808) configured to initiate operation of all or some of the scent control material sources based on a schedule, timer, user input, or other operational actuation. For example, operation of one or more scent control material sources within one of the multiple separate environments can be initiated when a temporary occupant (e.g., hotel guest, cruise ship passenger, hospital patient, etc.) endeavors to occupy the environment (e.g., the occupant checks into a hotel and reserves a room). Alternatively, or additionally, operation of one or more scent control material sources within one of the multiple separate environments can be initiated when a temporary occupant (e.g., hotel guest, cruise ship passenger, hospital patient, etc.) endeavors to vacate the environment (e.g., the occupant checks out of a hotel). In some examples, the controller can cause one or more subsets of the scent control material sources to treat respective environments based on a schedule, such as, after a particular interval of time has lapsed or the environment has been utilized or occupied a predetermined number of instances.

In some embodiments, the controller can additionally or alternatively receive input causing one or more of the scent control material sources to treat one or more of the multiple separate environments. For example, after the environment has been cleaned using traditional cleansing techniques (e.g., vacuuming, laundering fabrics, applying sanitizers and other chemicals to hard surfaces, etc.), the controller can receive an input or other command from one or more persons (e.g., a cleaning staff member or other person) which cause the one or more scent control material sources to treat one or more of the multiple separate environments.

The methods herein may include controlling air flow or air pressure in the environment. For example, the air flow or air pressure may affect the concentration of oxidant in a confined environment to a lesser (but in some cases desired) magnitude than humidity. Accordingly, dehumidifying and humidifying the environment with a dehumidifier and humidifier may be omitted in some methods.

An example method may include releasing a first portion of an oxidant into the environment for a first duration of time, pausing the release of the oxidant for a second duration of time, and releasing a final portion of oxidant for a final duration of time. Any number of releases of oxidant and pauses between releases may be utilized. Such releases may be at any of the rates or output amounts disclosed herein. Such releases and pauses may be for any of the on-time or off-time durations disclosed herein. The methods disclosed herein may include terminating at least some air flow into the environment prior to releasing a first portion of an oxidant, such as turning a heating, ventilation, and air conditioning (HVAC) input off in the environment. Such termination of air input may create a negative pressure in the environment. The input rate or amount of release of the oxidant in the environment may be selected to provide an amount of oxidant in the environment sufficient to eliminate scent material, scent material sources, or pathogens in the environment under negative pressure (e.g., to reach any of the concentrations disclosed herein for any of the durations disclosed herein). For example, releasing a first portion of an oxidant into the environment for a first duration of time and releasing a final portion of oxidant for a final duration of time includes releasing an amount of oxidant sufficient to eliminate pathogens in the environment under negative pressure, such as any of the pressure disclosed herein. The methods disclosed herein may include turning the HVAC input on in the environment after releasing the final portion of oxidant for the final duration of time. Recommencing input from the HVAC system reduces the concentration of oxidant in the environment.

The methods herein may include releasing oxidant in an environment having a positive air pressure, such as any of the air pressures disclosed herein. In such examples, the HVAC system may be operating to input air into the environment. The input rate or amount of release of the oxidant in the environment may be selected to provide an amount of oxidant in the environment sufficient to eliminate scent material, scent material sources, or pathogens in the environment with the positive pressure (e.g., to reach any of the concentrations disclosed herein for any of the durations disclosed herein). In some examples, all air flow in the environment may be terminated during release of oxidant such as to create no air pressure differential in the environment. After release of oxidant, the air flow may be initiated to create positive or negative pressure in the environment to reduce the concentration of oxidant therein.

The systems and methods herein provide for controlled treatment of scents and pathogens in an environment using efficient production of oxidizers at low relative humidity in combination with heightened activation of the oxidizers by increasing the relative humidity. Such humidity control can be cyclical. The systems and methods disclosed herein provide effective treatment of scent molecules, scent sources, and pathogens without prolonging the environment to exposure to the scent control material (e.g., ozone). Such systems and methods limit the damage oxidants may do to objects in the environment while controlling scents and pathogens in the environment.

In some examples, the endpoint values disclosed herein may be approximate values, which may vary by 10% or less from the precise endpoint value given. In such examples, the term "about" or "substantially" may indicate the approximate values.

Aspects of any of the examples disclosed herein may be used with aspects of any other examples, disclosed herein without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A device for treating an environment, the device comprising:
   a scent control material source configured to generate a scent control material;
   a humidifier source comprising at least one of water or a chemical;
   a humidifier including a diffuser operably coupled to the humidifier source to generate a humidifier output based on the at least one of the water or the chemical; and
   a controller comprising:
      a processor; and
      memory storage comprising computer-executable instructions that, when executed by the processor, cause the device to:
         perform, during a treatment period, a scent control treatment comprising cycles of releasing the scent control material from the scent control material source into an environment alternated by predetermined pauses of releasing the scent control material into the environment; and
         perform, after completion of the treatment period, a dilution cycle comprising a release of the humidifier output from the humidifier into the environment, the dilution cycle configured to reduce a concentration of the scent control material in the environment.

2. The device of claim 1 wherein the scent control material source is configured to output a first scent control material and a second scent control material, the first scent control material including ozone, and the second scent control material including an odor absorbent material.

3. The device of claim 2 wherein the odor absorbent material includes one or more cyclodextrins.

4. The device of claim 1, further comprising:
   a dehumidifier; and
   computer-executable instructions that, when executed by the processor, cause the device to perform, prior to the treatment period, a pre-treatment comprising dehumidifying the environment utilizing the dehumidifier.

5. The device of claim 1, further comprising a sensor, wherein the sensor is configured to measure a relative humidity level of the environment.

6. The device of claim 1 wherein the scent control material source is configured to output a first scent control material into the environment and the controller is configured to determine a concentration level of the first scent control material in the environment based on a size of the environment and a quantity of first scent control material discharged from the scent control material source.

7. The device of claim 1 wherein the device is portable.

8. The device of claim 1, wherein the environment is an at least partially enclosed environment.

9. The device of claim 8, wherein the at least partially enclosed environment comprises at least one of a hotel room, a restaurant, a rental vehicle, a public transportation vehicle, a stadium, a hospital, a cruise ship, or a convention center.

10. The device of claim 1, wherein the scent control material source is integrated with a heating, ventilation, and air conditioning (HVAC) system.

11. The device of claim 10, wherein the scent control material source is disposed within or at one or more vents of the HVAC system configured to supply conditioned air to the environment.

12. The device of claim 10, wherein the memory storage further comprises computer-executable instructions that, when executed by the processor, cause the device to control air flow of the HVAC system.

13. The device of claim 12, wherein the computer executable instructions, when executed by the processor, cause the HVAC system to terminate the air flow into the environment during the treatment period.

14. The device of claim 13, wherein the computer executable instructions, when executed by the processor, cause the HVAC system to recommence the air flow into the environment during the dilution cycle.

15. The device of claim 1, wherein the scent control treatment is based on pressure conditions of the environment.

16. The device of claim 1, further comprising a user interface configured to receive input to control operation of the device.

17. The device of claim 1, wherein the humidifier source comprises a reservoir fillable with the at least one of the water or the chemical.

18. The device of claim 1, wherein the water of the humidifier source is provided to the humidifier via an external water source.

19. The device of claim 1, wherein:
   the treatment period is a first treatment period; and
   the device further comprises computer-executable instructions that, when executed by the processor, cause the device to perform an additional scent control treatment during a second treatment period after completion of the dilution cycle, the additional scent control treatment comprising additional cycles of releasing the scent control material from the scent control material source into the environment alternated by additional predetermined pauses of releasing the scent control material into the environment.

20. The device of claim 1, further comprising:
   a fan; and
   computer-executable instructions that, when executed by the processor, cause the device to activate the fan during the treatment period at the predetermined pauses of releasing the scent control material into the environment.

* * * * *